United States Patent
Ohtsu et al.

(10) Patent No.: US 6,436,591 B1
(45) Date of Patent: Aug. 20, 2002

(54) CONDUCTIVE COLOR FILTER, METHOD FOR MANUFACTURING THE SAME, AND LIQUID CRYSTAL DISPLAY ELEMENT

(75) Inventors: Shigemi Ohtsu; Keishi Shimizu; Takao Tomono; Eiichi Akutsu, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/574,112

(22) Filed: May 19, 2000

(30) Foreign Application Priority Data

Jun. 15, 1999 (JP) .............................. 11-168755

(51) Int. Cl.⁷ .......................... G02B 5/20; G02F 1/1335
(52) U.S. Cl. .............................. 430/7; 349/106; 205/91; 205/124
(58) Field of Search ............................ 430/7; 349/106; 205/91, 123, 124

(56) References Cited

FOREIGN PATENT DOCUMENTS

| JP | 5-119209 | 5/1993 |
| JP | 5-157905 | 6/1993 |
| JP | 5-297215 A | * 11/1993 |
| JP | 9-120179 A | * 5/1997 |
| JP | 11-133224 A | * 5/1999 |

OTHER PUBLICATIONS

A. Fujishima et al., *Electrochemical Photolysis of Water at a Semiconductor Electrode*, Nature, vol. 238, 1972, pp. 37–38.
H. Yoneyama et al., *Photoelectrochromic Properties of Polypyrrole–Coated Silicon Electrodes*, Socl, vol. 132, No. 10, 1985, pp. 2414–2417.

* cited by examiner

*Primary Examiner*—John A. McPherson
(74) *Attorney, Agent, or Firm*—Oliff & Berridge, PLC

(57) ABSTRACT

Disclosed is a method for manufacturing conductive color filters having a fine, complicated pixel pattern, a high resolution, high surface smoothness, and a high, uniform conductivity. The method comprises the selective formation of a black matrix on a light-transmitted photoconductive thin film of a light-transmitting substrate, which comprises the light-transmitting conductive film stacked upon a photoconductive thin film and allowing at least the photoconductive thin film of the substrate to be in contact with an electrolyte containing a conductive electrodeposition material containing a coloring material. The photoconductive thin film is then irradiated with light, and the electrodeposition material is then selectively deposited in a light-irradiated area of the photoconductive thin film, thereby forming a conductive colored electrodeposition film.

31 Claims, 5 Drawing Sheets

CONDUCTIVE COLOR FILTER, METHOD FOR MANUFACTURING THE SAME, AND LIQUID CRYSTAL DISPLAY ELEMENT

BACKGROUND OF THE INVENTION

1. Field of the Invention

The present invention relates to a color filter for use in a CCD camera, various display elements such as liquid crystal display element, display panel, color image sensor, method and apparatus for manufacturing the color filter, and a liquid crystal display element using the color filter.

2. Description of the Related Art

Color filter manufacturing methods which are known at present include (1) dyeing method, (2) pigment dispersing method, (3) printing method, (4) ink-jet method, and (5) electrodeposition method.

According to the first method of dyeing, a water soluble polymer layer for dyeing is formed on a glass substrate and is patterned in a desired shape by photolithography. After that, the layer is soaked in a dye solution, thereby obtaining a colored pattern. By repeating the process three times, color filter layers of red (R), green (G), and blue (B) are obtained. Since hues are rich, transmittance is high, and the degree of completion of the technique is high, the color filter layers are used in many charge-coupled devices (CCD) at present. Since a dye is used; however, light resistance is low and the number of fabricating processes is large. As a method of fabricating the color filter for a liquid crystal display element (LCD), the pigment dispersing method is replacing the dyeing method.

According to the second method of pigment dispersion, a resin layer in which a pigment is dispersed is formed on a glass substrate and is patterned by photolithography. The process is repeated three times to thereby obtain color filter layers of R, G, and B. The fabricating method has drawbacks of a large number of processes and high cost.

According to the third method of printing, a pigment is dispersed in a thermosetting resin, colors of R, G, and B are applied by repeating printing three times, and the resin is set by being heated, thereby obtaining color filter layers. Although this method does not require photolithography for the RGB layer forming process, the method has drawbacks of low resolution and unevenness in film thickness.

According to the fourth method of ink jet, an ink-receiving layer is formed first, a desired pattern is formed and is made hydrophilic and hydrophobic, ink is jetted to hydrophilic areas to thereby obtain a color filter layer. Although the method also does not require photolithography, there is a drawback that the resolution is low. Since colors are often mixed between neighboring filter layers, the positional accuracy is also low.

According to the fifth method of electrodeposition, in an electrolyte obtained by dispersing a pigment in water soluble polymer, a high voltage of about 100 V is applied to a transparent electrode which is preliminarily patterned to form an electrodeposition film. By repeating the process three times, color filter layers of RGB are obtained. In the method, the electrode is preliminarily patterned by photolithography and is used as an electrode for electrodeposition. There is consequently a drawback that the pattern shape is limited and the color filter layer cannot be used for a TFT liquid crystal.

Generally, a color filter in which only color filter layers are formed cannot be used for a liquid crystal. It is necessary to cover the gaps between filter cells of the colors with a black matrix. Usually, photolithography is used to form the black matrix and it is one of major factors of high costs.

A method of manufacturing a color filter with a high resolution and excellent pattern accuracy by a simple process at low costs without performing a complicated process such as photolithography is desired. In recent years, a display capable of displaying video information and communication information with a high resolution has been being demanded more and more. A color filter that is patterned with a higher resolution is accordingly being demanded.

On the other hand, in a liquid crystal display (LCD) for displaying an image by using liquid crystal molecules, a color filter and a transparent substrate are disposed so as to face each other via a sealing material and a liquid crystal layer is formed between them. In order to display an image by controlling the alignment of the liquid crystal molecules in the liquid crystal layer, a drive electrode for controlling the alignment of the liquid crystal molecules has to be provided on the side where the color filter is disposed in the liquid crystal layer. Since the color filter layer is generally insulating, however, a conductive layer is indispensable between the liquid crystal layer and the color filter, and the layer has to be separately provided and used as a drive electrode.

In the color filter manufacturing process, therefore, a process for forming the conductive layer is added after the color filter layer is formed. It is, however, difficult to make the color filter layer itself uniformly and highly conductive in order to omit the process. Under present circumstances, a conductive color filter with a simple construction is not yet provided.

SUMMARY OF THE INVENTION

The present invention has been made in view of the above circumstances and realizes the following.

The invention provides a conductive color filter manufacturing method for easily manufacturing a conductive color filter having a fine, complicated pixel pattern, with high surface smoothness and a high resolution, and having high and uniform conductivity to enable the alignment of the liquid crystal molecules to be accurately controlled.

The invention also provides an apparatus for manufacturing a simple-structured conductive color filter having a conductive color filter layer with a high resolution at low cost by using the method.

The invention also provides a color filter having a uniform and high conductivity, which can be directly used in a liquid crystal display element without providing a conductive layer on a color filter layer formed.

Further, the invention provides a liquid crystal display element which uses a conductive color filter with a high resolution having a uniform and high conductivity that enables the alignment of the liquid crystal molecules to be accurately controlled, and which uses a light-transmitting conductive film as a component of the color filter as a drive electrode for liquid crystal display.

A part that solves the problems is as follows.

The present invention provides a method of manufacturing a conductive color filter, includes: a step of selectively forming a black matrix on a light-transmitting photoconductive thin film of a light-transmitting substrate on which a light-transmitting conductive film and the photoconductive thin film having a function of generating a photovoltaic force are stacked in this order; and a step of allowing at least the photoconductive thin film of the substrate to be in contact with an electrolyte including a conductive electrodeposition material containing a colorant, irradiating the photoconductive thin film with light, selectively making a light-irradiated area of the photoconductive thin film generate a photovoltaic force, and electrochemically depositing the electrodeposition material to thereby form a conductive colored electrodeposition film.

The electrodeposition material may contain a compound having a carboxyl group.

The compound having the carboxyl group may be a polymer having a hydrophobic group and a hydrophilic group and the number of hydrophobic groups may be 40 to 80% of the total number of the hydrophobic and hydrophilic groups.

The polymer may be a random copolymer of a monomer having a hydrophobic group and a monomer having a hydrophilic group.

In the conductive color filter manufacturing method, 50% or more of the number of hydrophilic groups of the polymer can change from a water-soluble state to a water-insoluble state or reversibly from a water-insoluble state to a water-soluble state in accordance with a change in pH.

In the conductive color filter manufacturing method, the electrodeposition material may contain a light-transmitting conductive material.

In the conductive color filter manufacturing method, the coloring material may be a conductive colorant, which can control alignment of liquid crystal molecules.

In the conductive color filter manufacturing method, the content of a compound having the carboxyl group may be 1.5 percent by weight or lower in contrast to 1 percent by weight of the conductive colorant.

In the conductive color filter manufacturing method, the electrodeposition material may contain a light-transmitting conductive high-molecular compound.

In the conductive color filter manufacturing method, the electrolyte may contain supporting salt, which does not exert an influence on electrodeposition characteristics.

The conductive color filter manufacturing method further includes: a step of forming a conductive protective layer on the colored electrodeposition film and the black matrix that contain water by which charges can move, after forming the conductive colored electrodeposition film and the black matrix.

In the conductive color filter manufacturing method, a voltage of 5 V or lower may be used as an electrodeposition potential in the step of forming the conductive colored electrodeposition film.

In the conductive color filter manufacturing method, after the black matrix is formed via a photomask, a colored electrodeposition film of a single color or plural colors may be formed so as to have an area overlapped with the black matrix.

According to further another aspect of the invention, in the conductive color filter manufacturing method, after a colored electrodeposition film of a single color or plural colors is formed via a photomask, a black matrix may be formed so as to have an area overlapped with the colored electrodeposition film.

In the conductive color filter manufacturing method, light irradiation may be performed by an exposure system in which at least an image forming optical member A, a photomask for patterning a substrate on which at least a conductive film and a photoconductive thin film are stacked in this order, an image forming optical member B, and a light source are disposed in this order from the substrate side.

In the conductive color filter manufacturing method, light irradiation may be performed by an exposure system in which at least a mirror reflection optical member, a photomask for patterning a substrate on which at least a conductive film and a photoconductive thin film are stacked in this order, an image forming optical member, and a light source are disposed in this order from the substrate side.

This invention also povides a conductive color filter manufacturing apparatus using the conductive color filter manufacturing method includes: an image forming optical member A; a photomask for patterning a substrate on which at least a conductive film and a photoconductive thin film are stacked in this order; an image forming optical member B; and a light source, the component being disposed in this order from the substrate side.

This invention also provides a conductive color filter manufacturing apparatus using the conductive color filter manufacturing method includes: a mirror reflection optical member; a photomask for patterning a substrate on which at least a conductive film and a photoconductive thin film are stacked in this order; an image forming optical member; and a light source, the component being disposed in this order from the substrate side.

This invention also provides a conductive color filter obtained by the conductive color filter manufacturing method.

This invention also provides a liquid crystal display element wherein the conductive color filter is used as a drive electrode for liquid crystal display.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

Figure 1:
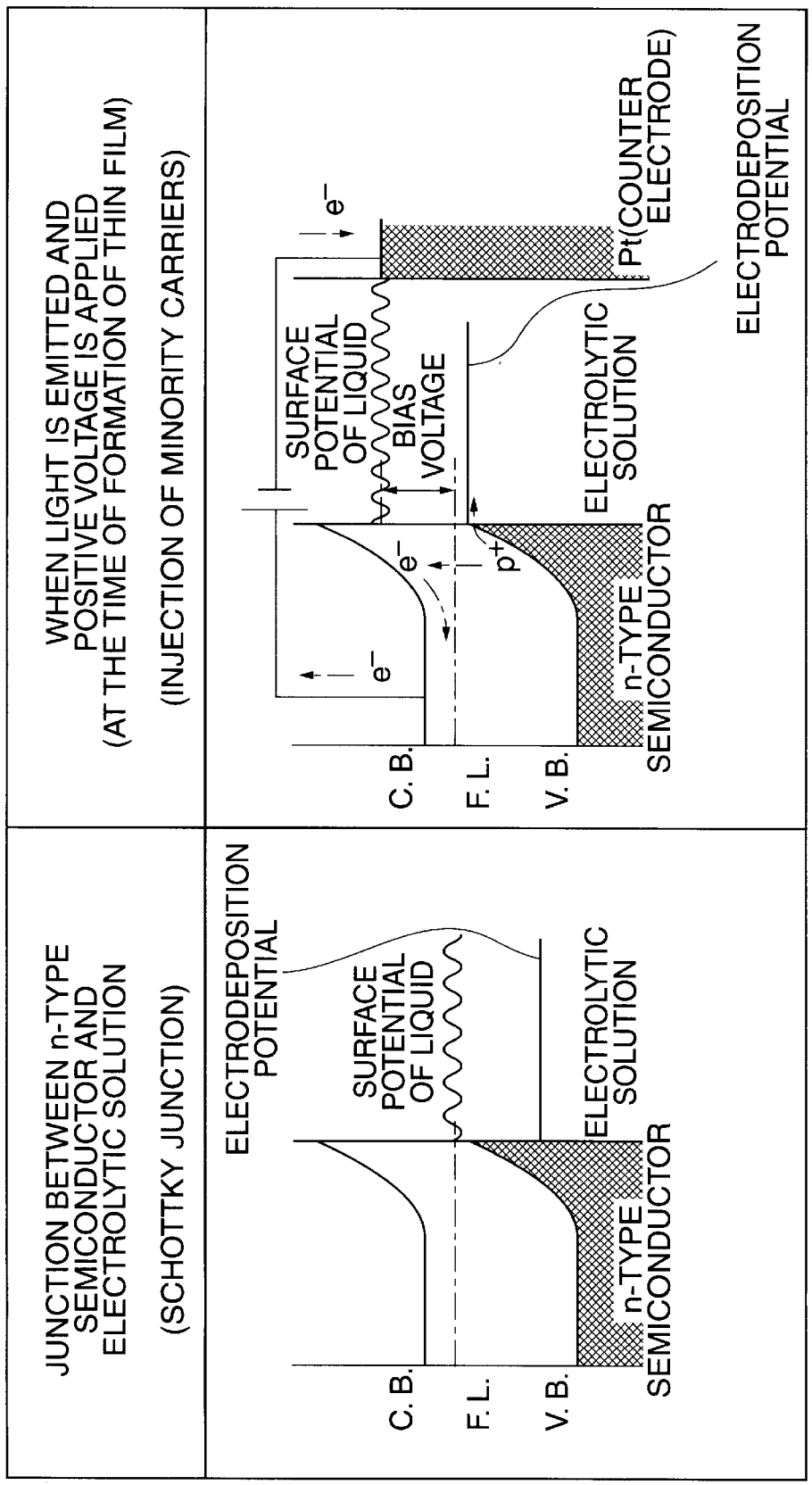
FIG. 1 is a diagram for explaining an energy band of a photoconductor.

A conductive color filter manufacturing method of the invention includes a step of forming a black matrix and a step of forming a conductive colored electrodeposition film. An electrolyte used in the step of forming the conductive colored electrodeposition film includes a conductive electrodeposition material or supporting salt. The photoconductive film is allowed to be in contact with the electrolyte and is irradiated with light. A conductive color filter layer is formed only in the light-irradiated area.

The color filter of the invention is obtained by the conductive color filter manufacturing method of the invention. In the color filter, a light-transmitting conductive film, a light-transmitting semiconductor thin film and a conductive color filter layer are formed on a light-emitting substrate. Other layers may be deposited as necessary.

A conductive color filter manufacturing apparatus of the invention uses the conductive color filter manufacturing method of the invention, and includes an exposure system provided with: an image forming optical member A; a photomask for patterning a substrate on which at least a conductive film and a photoconductive thin film are stacked in this order; an image forming optical member B; and a light source. The components are disposed in this order from the substrate side. Alternately, the conductive color filter manufacturing apparatus of the invention includes an exposure system provided with: a mirror reflection optical member; a photomask for patterning a substrate on which at least a conductive film and a photoconductive thin film are stacked in this order; an image forming optical member; and a light source. The components are disposed in this order from the substrate side.

In a liquid crystal display element of the invention, the conductive color filter obtained by the conductive color filter manufacturing method of the invention is disposed so that the color filter layer and the liquid crystal layer are in direct contact with each other and the light-transmitting conductive film in the color filter is used as a drive electrode for liquid crystal display.

The conductive color filter manufacturing method of the invention will now be described in detail hereinbelow. Through the description, the details of a manufacturing apparatus, a conductive color filter, and a liquid crystal display element of the invention will be clarified.

Color Filter Manufacturing Method

A color filter manufacturing method of the invention includes: a step of forming a conductive electrodeposition film (hereinbelow, referred to as "colored electrodeposition film") having mainly coloring matter molecules on a substrate on which a conductive film and a photoconductive thin film which will be described hereinlater are stacked in this order (hereinbelow, also called "colored electrodeposition film forming process"); and a step of forming a black matrix (hereinbelow, also called "black matrix forming process"). The order of the colored electrodeposition thin film forming process and the black matrix forming process may be opposite. From the viewpoint of increasing the resolution of the color filter, it is preferable to perform the black matrix forming process first and then the colored electrodeposition thin film forming process.

Colored Electrodeposition Film Forming Process

The colored electrodeposition thin film forming process in the color filter manufacturing method of the invention is realized by a film forming technique using an electrodeposition technique. Among water-soluble molecules, attention is paid to molecules whose solubility into water largely changes according to an oxidation state, a neutral state, and a reduction state. The principle of making the state shifted by either electrochemically oxidizing or reducing the water-soluble molecules or properly changing pH of an aqueous solution in which water-soluble molecules are dissolved is used.

For example, Rose Bengal, eosin, or the like as a fluorescein dye enters a reduction state and is dissolved in water when the pH is 4 or greater. When the pH is below 4, such a dye is oxidized, neutralized, and deposited. The solubility of a coloring matter material having a carboxyl group, generally, varies largely according to the hydrogen ion concentration (pH) in a solution without any structural change. For example, a water-resistant improved ink jet resin dissolves in water at the pH of 6 or greater but is deposited at the pH below 6. When a solution obtained by dissolving the coloring matters in pure water is used as an electrolyte, electrodes are soaked in the electrolyte and a voltage is applied, an electrodeposition film (colored electrodeposition film) made by the molecules of the coloring matters is formed on an anode electrode.

Similarly, a water soluble acrylate resin as a kind of a polymer compound having a carboxyl group dissolves in water when the pH is 6 or greater, but it is deposited when the pH is below 6. When the acrylate resin and a pigment are dispersed in a manner similar to the above, the electrodes are soaked and a voltage is applied, the pigment and acrylate resin are deposited on the anode electrode. An electrodeposition film in which the pigment and the acrylate resin are mixed is formed.

The electrodeposition film formed as mentioned above can be eluted again into an aqueous solution by application of a reverse voltage or by being soaked in an aqueous solution having the pH which is from 10 to 12.

Each of an oxazine basic dye Cathilon Pure Blue 5GH (C. I. Basic Blue 3) as one of quinone imine dyes and a thiazine basic dye Methylene Blue (C. I. Basic Blue 9) is oxidized and the color is developed when the pH is 10 or less. When the pH is greater than 10, each of the dyes is reduced, becomes insoluble, and is deposited. When the dyes are dissolved in pure water, the electrodes are soaked, and a voltage is applied, an electrodeposition film made of molecules of the dyes is deposited on the cathode electrode. Similarly, by applying a reverse voltage or by soaking the electrodeposition film of the dyes in an aqueous solution of the pH 8 or less, the dye molecules can be eluted again into the aqueous solution.

It is, however, necessary to apply a voltage of a predetermined threshold or higher to form a colored electrodeposition film. The electrodeposition film is not always formed by simple passage of a current. By applying a bias voltage, therefore, even if the level of a voltage applied from the outside is low, the colored electrodeposition film can be formed. By controlling the input voltage level used, a desired colored electrodeposition film can be formed.

When a semiconductor material is used for a substrate on which the colored electrodeposition film is to be formed, and is used as an electrode, by using light as an input signal and controlling the irradiation of light, the colored electrodeposition film can be formed in a desired position. Thus, an arbitrary image pattern can be formed.

More specifically, an electrolyte vessel having therein a solution in which an electrodeposition material containing a pigment, a dye or the like of which solubility largely varies according to a change in a liquid state is dissolved and dispersed is prepared. In a state where an organic or inorganic semiconductor material as an electrode is in contact with or soaked in the electrolyte in the vessel, the semiconductor material is irradiated with light so as to be in a desired image pattern, thereby depositing the electrodeposition material in the electrolyte on the semiconductor material. A color filter of a single color having the color filter layer in the desired image pattern can be formed. By repeating the process by using electrolytes of red, green, and blue, a multicolor filter can be formed.

Different from the conventional electrodeposition method, the pre-patterned transparent conductive film is unnecessary and an arbitrary smooth image pattern can be formed with a high resolution by a simple method at low cost without performing photolithography.

By using a conductive electrodeposition material as the electrodeposition material in the electrolyte, the conductive electrodeposition material can be deposited on the semiconductor material as an electrode. Consequently, a conductive color filter including a color filter layer having a desired conductivity can be formed.

Electrolyte

As the electrolyte, an aqueous electrolyte obtained by dissolving a conductive component in an aqueous solvent is used. Specifically, an aqueous electrolyte in which a conductive electrodeposition material is dispersed or dissolved may be used. An aqueous electrolyte containing supporting salt which does not exert an influence on the electrodeposition property may be also used together with the conductive electrodeposition material or without making the electrodeposition material conductive.

Electrodeposition Material

An example of the conductive electrodeposition material used in the conductive color filter manufacturing method of the invention is an electrodeposition material containing: at least ionic molecules whose solubility changes according to a change in the pH of a solution; and a coloring material such as a dye, a pigment, or a coloring matter for coloring an electrodeposition film in a desired color. It may also contain a conductive material. The conductive material can be contained or a conductive colorant may be used as the coloring matter without containing the conductive material.

A material that contains or does not contain the conductive material or the colorant and contains supporting salt, which does not exert an influence on the electrodeposition property, may be used as an electrolyte for forming a conductive colored electrodeposition film.

As the conductive material, a light transmitting conductive material, a light transmitting conductive high-molecular compound, supporting salt, a conductive colorant, and the like can be mentioned.

As the light transmitting conductive material, transparent conductive particles made of ITO, $SnO_2$, and the like can be listed.

As the supporting salt, a supporting salt which does not exert an influence on the electrodeposition property, for example, an inorganic salt such as NaCl, KCl, or $NH_4Cl$ and an organic salt such as tetraethyl ammonium chloride or tetraethyl ammonium perchlorate can be mentioned.

Various combinations of salts can be employed. Examples of cations are alkali metal ion, ammonium ion, and quaternary alkyl ammonium ion. Examples of anions are halogen ion, sulfate ion, perchlorate ion, nitrate ion, sulfonate ion, $BF^{4-}$, $PF^{4-}$, and the like. Among them, an ion which is not easily subjected to oxidation-reduction is preferable from the viewpoint of imparting conductivity. Further, from the viewpoint of solubility in water, ammonium salt and quaternary alkyl ammonium salt of halogen ion, nitrate ion, sulfate ion, and sulfonate ion are more preferable.

On the other hand, in order not to exert an adverse influence on a thin film transistor (TFT), it is preferable not to use an alkali metal.

In the case of using the conductive material, preferably, the content of a water soluble polymer to be dispersed, that is, an anion high-molecular compound having the carboxyl group or the like is 1.5 parts by weight in contrast to 1 part by weight of the conductive material.

By using the conductive colorant as the coloring matter contained in the electrodeposition material, the electrodeposition material can be made more conductive. Other examples of the conductive colorant are an ion coloring matter, which will be described hereinlater, carbon black and the like. For example, in the case of using carbon black for the black matrix, since the carbon black itself has high conductivity, it is not always necessary to add another conductive component.

When the ratio of the water-soluble polymer to be dispersed is higher than that of carbon black, there is a case that the material becomes insulating. In this case, the ratio of a pigment has to be increased. Since the conductivity of phthalocyanine pigments of blue and green is low, sufficient conductivity cannot be obtained only by increasing the percentage content of each of the pigments. In this case, by adding the above-mentioned light transmitting conductive material or the like, sufficient conductivity can be assured.

In the case of using the conductive colorant, preferably, the content of the water soluble polymer, that is, the anion high-molecular compound having the carboxyl group which will be described hereinlater or the like is 1.5 parts by weight in contrast to 1 part by weight of the conductive colorant.

Since the colored electrodeposition film is formed by using the electrolyte in which the conductive electrodeposition material is uniformly dispersed and dissolved as described above, a high-resolution color filter layer in which the conductivity in the formed colored electrodeposition film is extremely uniform and variations in conductivity are small among the films (pixels) can be formed. When the color filter layer is used for a liquid crystal display element, the liquid crystal molecules can be uniformly aligned over the whole surface.

The colorant itself does not always have to have the electrodeposition property. The colored electrodeposition film may be also formed by taking a colorant in and agglomerating and depositing the colorant when ionic molecules are electrodeposited. When the colorant itself is ionic molecules and has the electrodeposition property, only the colorant can be used as the electrodeposition material. When an electrodeposition material containing a pigment as a colorant and containing an ionic polymer is used, the light resistance of the colored electrodeposition film formed can be improved. It is therefore especially preferable.

The ionic molecules may be either anionic molecules having an anionic dissociation group or cationic molecules having a cationic dissociation group. Either the anionic molecules or the cationic molecules are selected according to the polarity of the photoconductive thin film used.

The selection of the ionic molecule as the electrodeposition material can be made according to the change characteristic of the solubility corresponding to a change in the pH of the ionic molecules. An electrodeposition material used for the invention preferably has the property that its solubility suddenly changes according to a change in the pH of a solution. For example, an electrodeposition material whose state changes (from dissolved state to deposition, or from deposition to dissolved state) according to a change in pH of ±2.0 of a solution, more preferably, a change in pH of ±1.0. By using the ionic molecules having the solubility property as the electrodeposition material, an electrodeposition film having high water resistance can be manufactured more promptly.

Preferably, the ionic molecules used as the electrodeposition material exhibit hysteresis in the state change (a change from the dissolved state to deposition and a change from deposition to the dissolved state) corresponding to a change in pH. To be specific, when the change to the deposition state according to decrease or increase in pH is sharp and the change to the dissolved state according to increase or decrease in pH is gentle, the stability of the colored electrodeposition film is improved. Consequently, it is preferable.

Examples of the ionic molecules are: an anionic high-molecular compound having the carboxyl group as an anionic dissociation group; and a cationic high-molecular compound having the amino group, imino group, or the like as a cationic dissociation group. Among them, a copolymer of a hydrophilic monomer having an ionic dissociation group and a hydrophobic monomer is preferable. A random copolymer is more preferable.

Among hydrophilic monomers each having an anion dissociation group are monomers having the carboxyl group such as methacrylic acid, acrylic acid, hydroxyethyl methacrylate, acrylamide, maleic anhydride, trimellitic anhydride, phthalic anhydride, hemimellitic acid, succinic acid, adipic acid, propionic acid, propionic acid, fumaric acid, and itaconic acid, and their derivatives.

Among them, methacrylic acid and acrylic acid are preferable since ionic polymers having them as monomers sharply change their states according to a change in the pH and have high affinity to an aqueous liquid.

Examples of monomers each having the cationic dissociation group are monomers each having an amino group or an imino group such as primary amine, secondary amine, tertiary amine, quaternary amine, oxazoline, alkylamine, alkylimine, polyamine, or polyimine.

The cation polymer having the cation dissociation group may be also obtained by introducing the cation dissociation group such as amino group or imino group to a polymer.

Preferably, the hydrophilic monomer contains 50 to 75 percent by weight of an ion dissociation group in its molecular structure. Also, two or more kinds of hydrophilic monomers may be combined.

Among the hydrophobic monomers are olefin such as ethylene or butadiene, styrene, α-methylstyrene, aethylstyrene, methyl methacrylate, ethyl methacrylate, butyl methacrylate, acrylonitrile, vinyl acetate, methyl acrylate, ethyl acrylate, butyl acrylate, and lauryl methacrylate and their derivatives.

Among them, styrene and α-methylstyrene are preferable because of high hydrophobicity, high electrodepositing efficiency, and high controllability at the time of copolymerization with a hydrophilic monomer. Two or more kinds of hydrophobic monomers may be combined.

In the case of using an ionic polymer together with a colorant, an ionic polymer which can make a transparent electrodeposition film is preferred since it does not disturb color development of the colorant. For example, a water-soluble acrylate resin is preferred.

From the viewpoint of liquid stability of the electrodeposition solution, the ionic polymer has to have a moderate hydrophilic nature. On the other hand, from the view point of film strength and water resistance of the electrodeposition film, the ionic polymer has to have a moderate hydrophobic nature.

The required balance between the hydrophilic nature and the hydrophobic nature of the ionic polymer used as the electrodeposition material can be expressed by, for example, the number of hydrophobic groups and the number of hydrophilic groups on a monomeric unit basis.

Specifically, when the ionic polymer is a copolymer of a hydrophobic monomer and a hydrophilic monomer, the ratio of the number of the hydrophobic groups with respect to the sum of the number of the hydrophobic groups and the number of the hydrophilic groups on the monomeric unit basis is preferably 40 to 80% and, more preferably, 55 to 70%.

When the ratio of the number of the hydrophobic groups is lower than 40%, in some cases, the water resistance and film strength of the electrodeposition film are insufficient. When it exceeds 80%, the affinity of the ionic polymer to an aqueous solvent decrease. Consequently, it causes deposition, and the viscosity of the electrodeposition solution becomes too high, so that an even electrodeposition film cannot be formed. On the other hand, when the number of the hydrophobic groups lies within the range, the affinity for an aqueous solvent is high, the liquid state of the electrodeposition solution is stabilized, and the electrodeposition efficiency is high. Thus, it is preferable.

Preferably, more than 50% of the hydrophilic groups are hydrophilic groups which can be changed from a water-soluble state to a water insoluble state or, reversibly, from the water insoluble state to the water soluble state.

When the ratio of the number of the hydrophilic groups is lower than 50%, the solubility in water is too low and the ionic polymer may not be dissolved in water.

The balance between the hydrophobic nature and hydrophilic nature of the ionic polymer can be expressed also by an acid value when an anionic polymer is used.

The acid value of the anionic polymer is preferably 60 to 300 and is more preferably 90 to 195 from the viewpoint of obtaining a good electrodeposition property.

When the acid value of the anionic polymer is lower than 60, the affinity for an aqueous solvent is too low. Consequently, the anionic polymer is deposited and the viscosity of the electrodeposition solution is too high, so that an even electrodeposition film cannot be formed. When the acid value exceeds 300, the water resistance of a formed electrodeposition film deteriorates and the electrodeposition efficiency is possibly lowered.

From the viewpoint of the film properties of the electrodeposition film and the like, the weight-average molecular weight of the ionic polymer is preferably $6.0 \times 10^3$ to $2.5 \times 10^4$ and, more preferably, $9.0 \times 10^3$ to $2.0 \times 10^4$.

When the weight-average molecular weight is lower than $6.0 \times 10^3$, the film becomes uneven and the water resistance decreases. As a result, a crack occurs in the electrodeposition film and the electrodeposition film is powdered, so that the electrodeposition film having high fastness properties cannot be obtained. When the weight-average molecular weight exceeds $2.5 \times 10^4$, affinity for an aqueous solvent deteriorates, deposition occurs, and the viscosity of the electrodeposition solution becomes too high. It makes the electrodeposition film uneven.

Preferably, the ionic polymer has a glass transition point of 80° C. or lower, fluidization start point of 180° C. or lower, and decomposition point of 150° C. or higher. It makes a transfer control easier when an electrodeposition film made of an ionic polymer deposited on a substrate is heat transferred onto another image holding substrate.

When the electrodeposition material contains an ionic colorant, the ionic colorant is a triphenylmethane phthalide dye, phenothazine dye, phenothiazine dye, fluorescein dye, indolyl phthalide dye, spiropyran dye, aza phthalide dye, diphenylmethane dye, chlomeno pyrazole dye, leuco auramine dye, azo methine dye, rhodamine lactal dye, naphtholactam dye, triazene dye, triazole azo dye, thiazole azo dye, azo dye, oxazine dye, thiazine dye, benzthiazole azo dye, quinone imine dye; a hydrophilic dye having either the carboxyl group, amino group, or imino group; or the like.

An aqueous electrolyte is obtained by dissolving or dispersing the electrodeposition material into an aqueous solvent. The aqueous solvent denotes a solvent which has water as the main component and to which other solvents having affinity for water such as alcohol, various salts, additives are added as desired within a range not deteriorating the effects of the invention.

The pH of the electrolyte before light irradiation is preferably set in a range of ±2 of the pH at which the state change of the electrodeposition material used occurs. By setting the pH of the electrolyte within the range, the solubility of the electrodeposition material in the aqueous solvent is saturated before the electrodeposition film is formed. As a result, once the colored electrodeposition film is formed, the electrodeposition material is not easily dissolved into the electrolyte. Consequently, the colored electrodeposition film can be formed stable. On the other hand, when the electrodeposition material is not saturated yet at the time of formation of the colored electrodeposition film, even if the electrodeposition film is formed, there is a case that the film starts to be dissolved again as soon as the supply of a current or the like is stopped.

In order to adjust the pH of the electrodeposition solution, it is preferable to form a colored electrodeposition film by adding an acid or alkali substance which does not exert an influence on the electrodeposition characteristics and lowering the bias voltage to 5 V or lower. It is more preferable to form the colored electrodeposition film by lowering the bias voltage to 2V or lower.

In order to form a black matrix and a colored electrodeposition film which make a sharp image having sharp edges, it is preferable to form the black matrix and the colored electrodeposition film at a predetermined electrodeposition speed by holding the electrolyte used at the time of electrodeposition at a constant temperature.

Various mixtures can be used including: a mixture of the same polar molecules such as a mixture of two or more kinds of anionic molecules or a mixture of two or more cationic molecules; a mixture of opposite polar molecules such as a mixture of an anionic molecule and a cationic molecule; a mixture of a dye and a pigment; and a mixture of a polymer and a pigment. In this case, a mixed color is obtained.

In the case of the mixture, at least one kind of molecule has to have the property that the solubility changes according to a change in pH to form a colored electrodeposition film. In this case, the coloring matter molecules incapable of forming a film is entrapped by the coloring matter molecules capable of forming a film, thereby obtaining a mixed color. For example, Rose Bengal or eosin as a fluorescein coloring matter enters a reducing state at the pH 4 or greater and is dissolved in water. When the pH is below 4, it is oxidized, neutralized, and deposited. Similarly, Pro Jet Fast Yellow 2 of a diazo pigment and a water-soluble acrylate resin of a certain kind dissolve in water at the pH 6 or greater, but are deposited when the pH is below 6.

When the molecules are dissolved in pure water, electrodes are soaked in the solution, and a voltage is applied, the electrodeposition film made of the molecules is formed on the anode side electrode. By applying a reverse voltage to the electrodeposition film or soaking the electrodeposition film in the solution of pH 10 to 12, the electrodeposition film can be redissolved in the solution. That is, when coloring matter molecules incapable of forming a film are mixed with Rose Bengal, eosin or Pro Jet Fast Yellow 2 each capable of forming a film by itself, an electrodeposition film of a mixed color is obtained. At this time, a material to be mixed may be either ionic or nonionic. The polarity of the ion is also arbitrary. For example, in the case of mixing two kinds of ions, generally, a mixture of a basic solution and an acid solution is neutralized. Another deposit such as a complex is generated. In the case of mixing two kinds of coloring matter molecules to produce a mixed color, generally, no-polar coloring matter molecules or coloring matter molecules of the same polarity are dispersed. There are, however, dyes each of which does not make a complex and in each of which coloring matter ions co-exist. In this case, even when a basic solution and an acid solution are mixed, deposition can be suppressed. The dyes can be therefore used irrespective of the polarity of ions.

A case of mixing two kinds of ionic coloring material molecules by using the nature will be described hereinbelow.

First, when electrochemically oxidation is brought about in a mixed solution in which Rose Bengal (red) having two kinds of coloring matter ions of the same polarity, which is for example anionic and can form a film, and Brilliant Blue (blue) which is anionic but cannot form a film are mixed, a colored electrodeposition film of purple which is the same color as that of the mixed solution is formed on the electrode. The film is formed when ions of Brilliant Blue are taken into Rose Bengal capable of forming a film. When two kinds of ions of the same polarity are mixed, it is sufficient that either one of the kinds of coloring matter ions has the film forming capability.

When oxidation is electrochemically carried out in the mixed solution in which two kinds of coloring matter ions of opposite polarities such as anionic Pro Jet Fast Yellow 2 (yellow) having film forming capability and cation Cathilon Pure Blue 5GH (blue) having film forming capability are mixed, a colored electrodeposition film of green which is the same color as that of the mixed solution is formed on the electrode. On the contrary, reduction is carried out electrochemically, a colored electrodeposition film of blue of Cathilon Pure Blue 5GH is deposited on the electrode. That is, when an electrochemical reaction is brought about in the mixture of the anionic coloring matter ion solution and the cationic coloring matter ion solution, by changing the polarity of a voltage to be applied, colored electrodeposition films of different coloring matters can be formed on the same electrode.

Further, in the case of using nonionic molecules such as pigment, by using a solution in which a pigment or the like and a transparent polymer material having the film forming capability such as a water-soluble acrylate resin or water-soluble styrene resin are mixed and dispersed, a colored electrodeposition film made of a pigment can be obtained.

A pH change occurring around the substrate in the electrolyte and an accompanying mechanism of forming a colored electrodeposition film will now be described.

When a platinum electrode is soaked in a solution and a current or voltage is supplied, $OH^-$ ions in the solution near the anode are consumed and $O_2$ is obtained. The amount of hydrogen ions increases and the pH is lowered. This is due to occurrence of the following reaction in which holes (p) and the $OH^-$ ions are bonded near the anode.

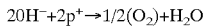

$$2OH^- + 2p^+ \rightarrow 1/2(O_2) + H_2O$$

The reaction occurs when the potential of the substrate exceeds a predetermined value (threshold potential). The reaction progresses after the potential exceeds the threshold potential and the pH in the solution changes (the pH decreases near the anode and increases near the cathode).

In the case of forming the colored electrodeposition film in the invention, a photoconductor is irradiated with light and is allowed to generate a photovoltaic force. A potential only in the light-irradiated area is increased to exceed the threshold potential and the reaction is progressed only in the electrolyte near the light-irradiated area of the substrate. As a result of the progress of the reaction, the pH of the electrolyte near the light-irradiated area changes, the solubility of the electrodeposition material changes according to the change in pH, and a colored electrodeposition film is formed only in the light-irradiated area.

As mentioned above, various attempts of bringing about the electrochemical reaction by using the photovoltaic force have been being examined. For instance, an example of electrolyzing water with the photovoltaic force generated by irradiating $TiO_2$ of an n-type photoconductor has been reported by A. Fujishima and K. Honda, "Nature" Vol. 238, p37, 1972. An example of forming an image by using the photovoltaic force has been disclosed by H. Yoneyama, et al, J. Electrochem. Soc., p2414 (1985). In the example, an Si substrate is irradiated with light, pyrrole is electrolytically polymerized by a photovoltaic force generated and an image is formed by doping/undoping. We are also applying for a patent a method of forming an image with light by using a coloring matter for doping/undoping of a conductive polymer. In the case of forming an image by a conductive polymer by using the photovoltaic force, however, coloring materials which can be used are limited. As a result, it is difficult to form an image of many colors.

Even in the case of a system in which no conductive polymer exists, a colored electrodeposition film can be formed. A voltage necessary to form a colored electrodeposition film is larger as compared with a case where the conductive polymer exists. For example, "Color Filter Manufacturing Method and Electrodeposition Substrate for Manufacturing Color Filter" in Japanese Published Unexamined Patent Application No. Hei 5-119209 and "Color Filter Manufacturing Method" in Japanese Published Unexamined Patent Application No. Hei 5-157905 disclose a technique for forming a colored electrodeposition film by irradiating a photoconductive thin film with light and utilizing the photoconductivity appeared in the light-irradiated area. The application voltage ranges from 20 V to 80 V and the electrodeposition substance utilizes the oxidation-reduction reaction of the polymer. On the other hand, the photovoltaic force of the photoconductive thin film is smaller than 1 V (for example, about 0.6 V in the case of Si). Only the photovoltaic force is not sufficient to form an image. The potential may be increased by preliminarily supplying a current or voltage. When a voltage exceeding a predetermined voltage (voltage corresponding to a band gap of the photoconductor used) is applied (for example, a voltage exceeding 5 V when Si is used), however, a Schottky barrier between a semiconductor and the electrodeposition solution is destroyed and an image cannot be formed. In the invention, the oxidation-reduction reaction of the polymer or the like is not utilized for electrodeposition. As stated above, the colored electrodeposition film is formed by utilizing a change in solubility of the electrodeposition material corresponding to a change in the pH of the electrodeposition solution. Thus, the electrodeposition can be implemented within the range where the Schottky barrier is not destroyed.

In the invention, a voltage can be preliminarily applied to a substrate (light transmitting conductive film in the substrate). The bias voltage applied at this time compensates the potential which is generated in the substrate by the photovoltaic force appearing in the photoconductive thin film. The magnitude of the bias voltage is set so that the potential of the substrate reaches the threshold potential. The bias voltage applied is set so as not to exceed the Schottky barrier. The reason for this is that when a voltage preliminarily applied to the substrate is too large, the Schottky barrier is destroyed, a current flows in the area which is not irradiated with light, the electrodeposition film is formed over the whole area of the photoconductive substrate, and the position of forming the colored electrodeposition film cannot be controlled.

For example, since the photovoltaic force of $TiO_2$ is approximately 0.6 V, in the case of the electrodeposition material which is electrodeposited at 2.0 V, when light is irradiated while applying a bias voltage of 1.5 V, the potential in the light-irradiated area of the substrate (photoconductive film) becomes 0.6 V+1.5 V=2.1 V. The potential is higher than the threshold necessary for the electrodeposition and a colored electrodeposition film is formed only in the light-irradiated area. On the other hand, when a bias voltage of 2.5 V or higher is applied to the substrate, the Schottky barrier is destroyed.

The combination between the photoconductor and the electrodeposition material will now be described.

In the invention, the Schottky barrier occurring in the interface in contact with the photoconductor or a barrier in a pn junction or a pin junction is used to form the photovoltaic force. The Schottky barrier which occurs in the interface between an n-type photoconductor and the electrolytic solution is schematically shown in the left side of FIG. 1. The energy band of the pin junction is schematically shown in the right side of FIG. 1.

For example, in the case of using the n-type photoconductor (left side), when the n-type photoconductor side is made negative, the direction of a current is the forward direction, so that the current flows. On the contrary, when the n-type photoconductor side is made positive, the Schottky junction between the n-type photoconductor and an aqueous electrolytic solution creates a barrier, so that no current flows. Even in a state where the n-type photoconductor side is made positive and a current is not flowed, when irradiated with light, electron hole pairs are generated from the n-type photoconductive thin film, the holes are moved to the solution side and the current flows. In this case, since the n-type photoconductor has the positive potential, the material to be electrodeposited has to be anionic molecules. The combination of the n-type photoconductor and the anionic molecules is therefore made. On the other hand, cations are electrodeposited on a p-type photoconductor. Especially, in the case of using the n-type photoconductor, it is preferable to use a colored electrodeposition material containing anionic molecules having the carboxyl group. In the case of using the p-type semiconductor, it is preferable to use a colored electrodeposition material containing cationic molecules having the amino group or imino group.

In order to supply a current or voltage to a conductive film, it is sufficient to provide a current carrying passage for supplying a current or voltage to the periphery or the like of the conductive film. A potentiostat or the like can be used to supply a current or voltage.

Black Matrix Forming Process

A black matrix forming process will now be described.

In the black matrix forming process, by a process similar to the colored electrodeposition film forming process, an area is irradiated with light by using an electrolyte containing a colorant of black and a colored electrodeposition film of black, that is, a black matrix may be formed selectively in the light-irradiated area. A process of forming a metal-plating thin film by using an electrolyte including the electrodeposition material containing a metal is also possible.

In those cases, the black matrix can be simply formed with a high resolution without using photolithography. The black matrix forming process may be provided either before or after the colored electrodeposition film forming process.

In the case of providing the black matrix forming process after the colored electrodeposition film forming process, the black matrix may be formed in such a manner that a solution of an ultraviolet-curing resin containing a colorant of black such as black carbon powders is applied on a colored electrodeposition film formed on a substrate or a substrate on which a colored electrodeposition film is formed is soaked in the solution and is irradiated with ultraviolet rays, thereby forming a resin thin film containing a colorant of black.

As mentioned above, in the case of using the electrolyte containing the colorant of black, as the colorant of black, a known colorant of black can be properly used. In order to form a colored electrodeposition film so as to have an overlapped part after the black matrix is formed as will be described hereinlater, a conductive colorant of black is preferred. Especially, carbon black is preferable.

Polymer materials contained in the electrodeposition material are similar to those used in the colored electrodeposition film forming process.

In the case of forming a metal-plating thin film, an electrolyte containing an electrodeposition material including a metal is used. By a process similar to the colored electrodeposition film forming process and the black matrix forming process using the electrolyte containing the colorant of black, a black matrix made by a metal-plating thin film can be formed.

In an upper layer on which the metal-plating thin film is deposited, since the resistance of the metal film is low, a generated current is diffused, so that there is a tendency that the electrodeposition film is not easily deposited. It is therefore preferable since the black matrix can be made thinner.

In the case of forming the metal-plating thin film after the colored electrodeposition film forming process, an aqueous electrolyte used preferably has liquid characteristics which do not exert an adverse influence on the colored electrodeposition film. For example, when the colored electrodeposition film is made of an electrodeposition material having the anionic dissociation group, preferably, an aqueous electrolyte is acidic.

In the case of forming the metal-plating thin film before the colored electrodeposition film forming process, preferably, the metal-plating thin film has resistance to an aqueous electrolyte used for the colored electrodeposition film forming process. It is therefore preferable to use an electrolyte containing a metal having high fastness properties to form a metal-plating thin film. Examples of the metal are Ni, Cr, Cu, Au, Ag, Mo, Sn, Zn, Co, Ti, Ta, Pb, Rr, and the like. It is preferable to use an electrolyte containing one or plural kinds of metal ions selected from the above. Among them, metal ions selected from Ni, Cr, Cu, Au, Ag, Mo, Sn, Zn, and Co are more preferable from the viewpoints of the thin film forming capability, plating liquid stability, and the like.

Most metals are deposited on the cathode electrode. For example, when an n-type photoconductor such as titanium oxide is used as a photoconductive thin film constructing a substrate, in the colored electrodeposition film forming process, a bias is applied so that the substrate becomes anodic. In the case of forming a metal-plating thin film, a bias is applied so that the substrate becomes cathodic.

In the case of forming the black matrix by using a solution of an ultraviolet-curing resin containing the colorant of black, the colorant of black is dispersed in a solution obtained by dissolving an ultraviolet-curing resin into a solvent. The solution is applied on the whole surface of the substrate on the side the colored electrodeposition film is formed. Only an area where the black matrix is to be formed is irradiated with ultraviolet rays and is cured. After that, the solution is dissolved by a solvent to thereby remove the solution existing in a not-cured area.

In the case of forming the colored electrodeposition film and the black matrix on the substrate, in order to eliminate the gaps between the colored electrodeposition film and the black matrix, preferably, after the black matrix or the colored electrodeposition film of a single or plural colors are formed by using a photomask, the colored electrodeposition film of a single color or plural colors or the black matrix is formed so that the black matrix and the colored electrodeposition film are overlapped with each other.

Specifically, in the case of forming the colored electrodeposition film after forming the black matrix, the area of the black matrix is also irradiated with light so as to obtain an area overlapped with the black matrix, thereby forming the colored electrodeposition film also on the black matrix which is irradiated with light. A similar operation is performed in the case of forming the colored electrodeposition film and then the black matrix.

It is preferable to form a conductive protective layer to which an aligning process is performed on the colored electrodeposition film and the black matrix formed on the substrate.

An aligning process can be performed on the surface of the protective layer by a known method such as a rubbing process.

Light Source

As the light source for light irradiation to the photoconductive thin film, a conventional known light source such as mercury vapor lamp, mercury xenon lamp, He-Cd laser, gas laser, excimer laser, He-Ne laser, semiconductor laser, or infrared ray laser can be used.

Especially, a high-pressure mercury lamp and a mercury xenon lamp for outputting deep UV are preferable.

The irradiation light has to be light in a wavelength range for making the photoconductive thin film generate a photovoltaic force. For example, a photoconductor such as titanium dioxide or zinc oxide generates a photovoltaic force by being irradiated with ultraviolet rays. On the other hand, polysilicon, phthalocyanine compound, and the like generate a photovoltaic force by being irradiated with infrared rays. It is sufficient to properly select a light source of light sensed by the photoconductor used.

Examples of a method of emitting light in an image pattern are a method of exposing the whole face by using a mercury vapor lamp, a mercury xenon lamp, or the like via a photomask and a scan exposure method using a laser.

Substrate

Figure 2:
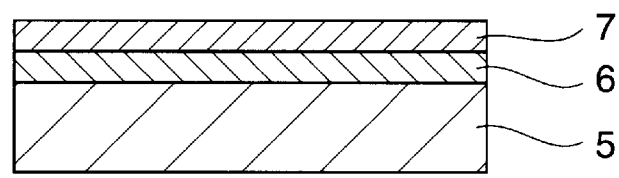
FIG. 2 is a cross section for schematically showing the structure of a transparent n-type semiconductor.

FIG. 2 shows the structure in cross section of a substrate used in the color filter manufacturing method of the invention.

The substrate is obtained by sequentially stacking at least a light-transmitting conductive film 6 and a photoconductive thin film 7 having a photovoltaic force function on a light-transmitting base substrate 5.

Base Substrate

Various light-transmitting materials can be used for the base substrate. For example, glass, plastics, and the like are preferable.

Conductive Film

The conductive film is made of a conductive, light-transmitting general material. For example, a metal such as Al, Zn, Cu, Fe, Ni, or Cr, a metal oxide such as ITO (indium tin oxide), tin dioxide can be used. A conductive carbon material, a conductive ceramics material, and the like can also be used. The conductive film can be formed on a supporting body by a conventionally known method such as evaporation, sputtering, or CVD.

Photoconductive Thin Film

Any photoconductive thin film as long as it generates a photovoltaic force by being irradiated with light can be used. The photoconductor has a light history effect for retaining an effect by light irradiation for a predetermined period. Preferably, the photoconductor used for the invention has a weak light history effect. A photoconductor having a strong light history effect can also be used since the light history effect tends to be decreased by reducing the thickness of the photoconductive thin film.

There are an n-type photoconductor and a p-type photoconductor. Either one of them can be used in the invention. A multilayer-structured photoconductive thin film is preferable since a photoelectric current of a high output can be certainly obtained and the contrast of an image is higher. The multilayer-structured photoconductor thin film is, for example, a photoconductive thin film having a pn junction obtained by stacking the n-type photoconductive thin film and the p-type photoconductive thin film or a photoconductor having a pin junction, in which a p-type photoconductive thin film, an i-type photoconductive thin film, and an n-type photoconductive thin film are stacked.

The photoconductive thin film used in the invention may be either an inorganic photoconductor or an organic photoconductor.

Among the inorganic photoconductors are titanium oxide, silicon carbide, zinc oxide, lead oxide, nickel oxide, tin oxide, molybdenum oxide, SiGaN, a-C, BN, ZnSe, diamond, GaAs compound, CuS, $Zn_3P_2$, polysilicon, and the like.

Examples of the organic photoconductors are phthalocyanine pigment, perylene pigment, azo pigment, polyvinylcarbazole, and polyacetylene.

A mixture of the materials may also be used. Plural photoconductive thin films each made of different materials may also be used.

Among them, a metal oxide such as $TiO_2$ or ZnO exhibits excellent stability at the time of electrodeposition and also has high light irradiation efficiency. The metal oxide is suitable when repeatedly used.

It has been clarified by studies in recent years that a good n-type photoconductive thin film is obtained by using $TiO_2$ by a sol-gel method, sputtering, electron beam evaporation, or the like.

In order to increase the phototransforming efficiency of the photoelectric current, a reducing process is effective. Usually, the film is heated at approximately 550° C. in a hydrogen gas. For example, it can be achieved by heating at approximately 300° C. for ten minutes at a flow rate of 1 liter per minute by using gaseous nitrogen in which 3% of hydrogen is mixed.

The photoconductive thin film can be formed on the conductive film by a conventionally known sol-gel method, sputtering, electron beam evaporation, ion coating, glow discharge, or the like.

Although the thickness of the photoconductive thin film is not especially limited, from the viewpoint of obtaining excellent characteristics, 0.05 to 3.0 μm is preferable.

When the film thickness is smaller than 0.05 μm, the photovoltaic force generated is too weak and it may cause a problem in pattern formation. When the film thickness exceeds 3.0 μm, charges generated by light irradiation are trapped in the film and the light history effect increases. Consequently, the pattern forming performance deteriorates.

From the viewpoint of the photovoltaic force generating efficiency, the photoconductive thin film has preferably the film quality of microcrystal or polycrystal. Further, the photoconductive thin film which is made of only a photoconductor and does not contain an insulating material such as a resin is preferable. When an insulating material such as a resin is mixed to form a photoconductive thin film, the efficiency of generating the photovoltaic force deteriorates and the light history effect is increased.

The volume resistance value of the photoconductive thin film under light irradiation is, preferably, $10^{-2}$ to $10^8$ Ω·cm and, more preferably, $10^0$ to $10^6$ Ω·cm.

When the volume resistance value of the photoconductive thin film exceeds $10^8$ Ω·cm, a high voltage is necessary to pass a current, the efficiency of generating the photovoltaic force may remarkably deteriorate.

Color Filter

A color filter of the invention is obtained by the conductive color filter manufacturing method of the invention. A light-transmitting conductive film, a light-transmitting photoconductive thin film having a photovoltaic force function, and a conductive color filter layer are stacked on a light-transmitting base substrate. Other layers are deposited as necessary.

Figure 4A:
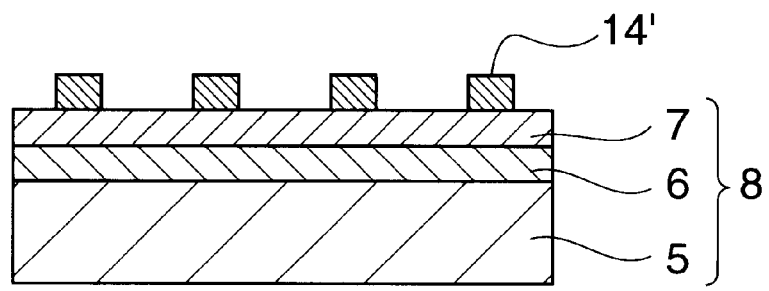
FIGS. 4A to 4C are schematic cross-sections of the structure of a conductive color filter of the invention as an example.
Figure 4B:
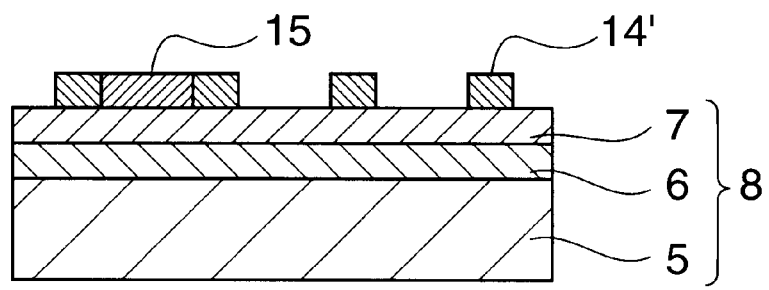
Figure 4C:
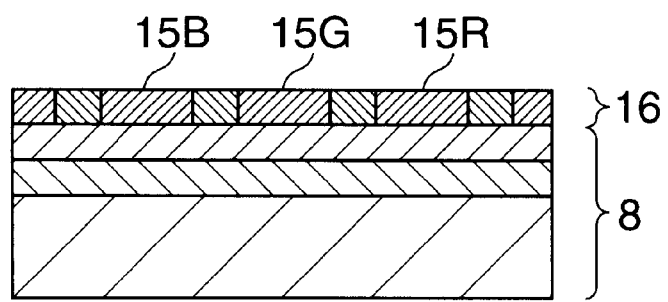

FIG. 4A is a cross section of a color filter in which only a black matrix is formed on the substrate. FIG. 4B is a cross section of the color filter in which a colored electrodeposition film of a single color is formed. FIG. 4C is a cross section of the color filter of the invention.

The color filter of the invention is characterized by having a color filter layer 16 obtained by forming conductive colored electrodeposition films 15B, 15G, and 15R of plural colors between the black matrix formed on the substrate 8. Since the color filter itself is conductive, when a liquid crystal display element in which the color filter layer and a liquid crystal layer are stacked is manufactured, the conductive film 6 can be used as a drive electrode for liquid crystal display.

Since the conductivity of the colored electrodeposition film is uniform and the colored electrodeposition film deposited by electrodeposition is extremely thin, the liquid crystal molecules in the liquid crystal layer can be uniformly aligned.

A black matrix 14' and the colored electrodeposition films 15B, 15G, and 15R may also be formed while being overlapped in order to eliminate gaps.

The color filter of the invention is manufactured by the color filter manufacturing method of the invention. The color filter has an extremely uniform and very conductive color filter layer of a high resolution.

When the color filter is used for a liquid crystal display element, generally, the color filter layer constructed by the colored electrodeposition film and the black matrix is insulating. Consequently, a conductive layer as a drive electrode for controlling the liquid crystal display has to be provided between the color filter layer and the liquid crystal layer. Since the color filter layer itself of the color filter of the invention is sufficiently highly conductive to control the liquid crystal molecules, a new conductive layer does not have to be provided. The conductive film of the color filter formed can be used as it is as the drive electrode. The liquid crystal display element having a high resolution with a simple structure can be therefore fabricated by a simple manufacturing process. Since the conductivity of the color filter layer is extremely uniform over the whole face, the alignment of the liquid crystal molecules can be uniformly controlled, and a clear full color image with high picture quality can be displayed.

Manufacturing Apparatus

The apparatus for manufacturing the conductive color filter of the invention will now be described.

The manufacturing apparatus of the invention uses the color filter manufacturing method of the invention and includes an exposure system in which at least an image forming optical member A or a mirror reflection optical member; a photomask for patterning the substrate on which at least the conductive film and the photoconductive thin film are stacked in this order; an image forming optical member B; and a light source are arranged in this order from the substrate side.

As a method of irradiating light in an image pattern, a proper one of known light irradiation methods such as a method of exposing the whole face by using a photomask by a known light source such as a mercury lamp or a mercury xenon lamp and a method of directly scanning-projecting an image by using a laser can be used.

The exposure system may be disposed over the surface (back side) of the substrate on which the conductive film 6 and the photoconductive thin film 7 are not formed in the substrate constructed as shown in FIG. 2. The photoconductive thin film 7 on the substrate is allowed to be in contact with an electrolyte containing a conductive electrodeposition material and irradiated with light in an image pattern by the exposure system to deposit the electrodeposition material, thereby forming a conductive color filter layer.

An arbitrary positional relation of the substrate with respect to the electrolyte when the photoconductive thin film 7 of the substrate is allowed to be in contact with the electrolyte can be properly selected. For example, the whole substrate may be disposed so as to be soaked in the electrolyte. The substrate may be disposed so that a part of the substrate, for example, only the photoconductive thin film as a part of the colored electrodeposition film is in contact with the electrolyte.

Since the electrolyte contains a component that absorbs light such as a colorant for forming the colored electrodeposition film, when the substrate is irradiated with light so as to be in a desired image pattern, it is difficult to irradiate the soaked substrate with light through the electrolyte.

In the color filter manufacturing method of the invention, therefore, it is preferable to dispose the substrate so that the area in which the colored electrodeposition film is to be formed is in contact with the electrolyte and the back side (the surface of the substrate, on which the photoconductive thin film is not formed) of a part in which the colored electrodeposition film is to be formed is out of the electrolyte.

On the other hand, in the case of forming an image pattern by irradiating the substrate on which the conductive film and the photoconductive thin film are formed with light, generally, a photomask and the surface of the photoconductive thin film of the substrate are closely attached to each other and the substrate is irradiated over the photomask with parallel light from a known light source.

Since the electrodeposition solution contains a component which absorbs light such as a colorant, when the face on which the photomask is closely attached is soaked in the electrolyte and is irradiated with light, a desired image pattern cannot be obtained. It is therefore preferable to dispose the photomask on the surface (back side) of the base substrate, on which the photoconductive thin film for forming the colored electrodeposition film is not deposited and to irradiate the substrate over the photomask on the back side with light so that the irradiation light does not pass through the electrolyte.

In the case of irradiating the photoconductive thin film on which the colored electrodeposition film is to be formed with light, since the incident light travels through the base substrate and the conductive film in the thickness direction of the substrate, the light may be diffused until it reaches the surface of the photoconductive thin film which is in contact with the electrolyte or the resolution may deteriorate due to an influence of diffraction.

Therefore, more preferably, by using an exposure system, an image is formed on the photomask by emitting light from the light source through the image forming optical member A. Light in an image pattern obtained through the photomask is cast on the exposure face through the image forming optical member B. In the exposure system, at least the image forming optical member B or the mirror reflection optical member; the photomask for patterning the substrate on which at least the conductive film and the photoconductive thin film are stacked in this order; the image forming optical member A; and the light source are arranged in this order from the substrate side which does not have the photoconductive thin film (exposure face) on which the black matrix and colored electrodeposition film are to be formed.

Figure 3:
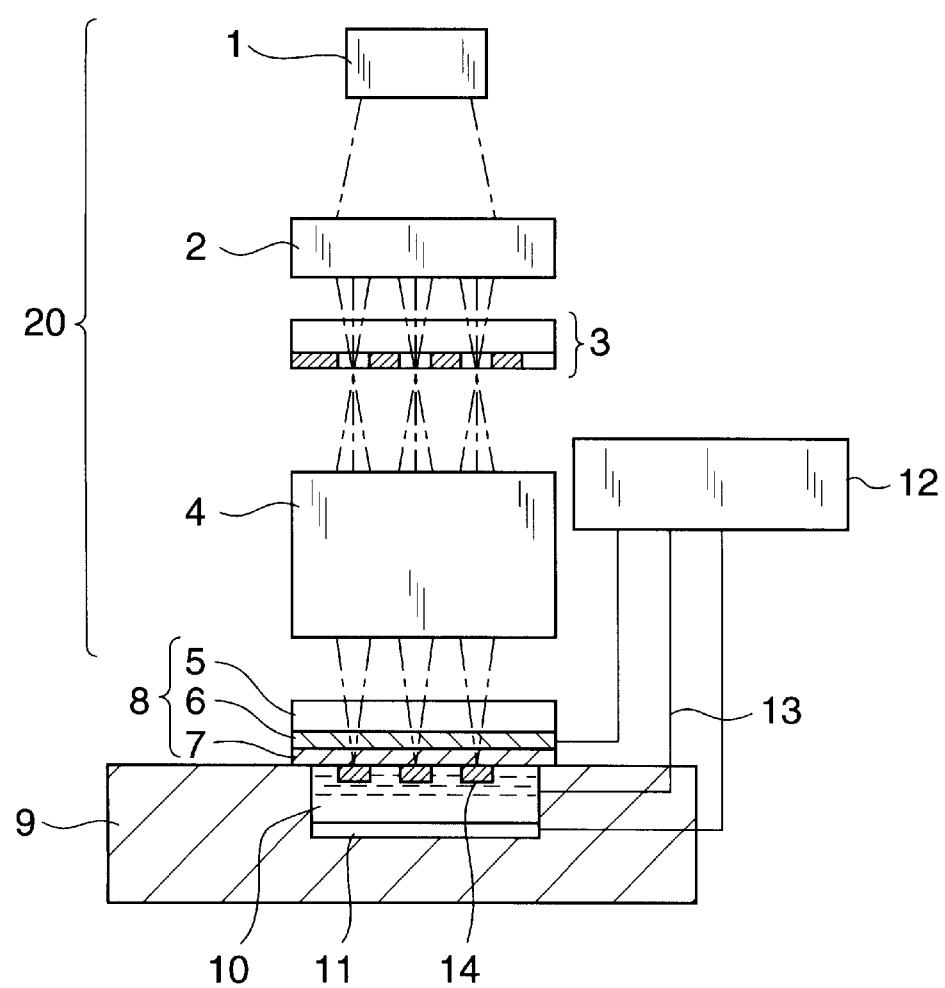
FIG. 3 schematically shows the construction of a color filter manufacturing apparatus of the invention as an example, which uses a projection exposure system.

The color filter manufacturing apparatus according to the invention may be formed in a mode as shown in FIG. 3.

Specifically, a known light source 1 such as a mercury vapor lamp or a mercury xenon lamp is used. Light is emitted from the light source 1 to form an image on a photomask 3 via an image forming optical member 2. The light is made in a desired image pattern via the photomask 3 and an image is formed via an image forming optical member 4 onto the surface of a photoconductive thin film 7 which is in contact with an electrodeposition solution 10 housed in an electrodeposition solution housing unit of a jig 9 for electrodeposition. The exposure system using the optical system is generally also called a projection exposure system.

In this case, in order to assure a predetermined potential, the substrate 8 is connected to a potentiostat 12 via an ITO thin film 6. The potentiostat 12 may be disposed in a three-electrode manner by being connected to a reference electrode 13 and a counter electrode 11, and a bias voltage may be applied.

In this case, both the black matrix and the colored electrodeposition film can be formed in an arbitrary order. A color filter having excellent surface smoothness and high resolution can be formed. Since the electrolyte in which the electrodeposition material is uniformly dispersed is used, a color filter having a uniform, very conductive color filter layer can be obtained.

The color filter can be manufactured at low cost with a simple structure without patterning by photolithography.

According to the invention, since light enters the back side of the substrate 8, the distance between the image forming optical member 4 and an image forming face (surface of the photoconductive thin film 7) (hereinbelow, called "focal length") is larger than the thickness of the substrate 8. On the other hand, when the focal length is long, the resolution deteriorates. It is not preferable to make the focal length extremely long also from the viewpoint of designing of the exposure system. Preferably, the focal length is 1 to 500 mm in practice.

In the projection exposure system, the depth of focus can be set as deep as ±10 to ±100 $\mu$m. Even when a flexure or the like occurs in the substrate 8 or a surface accuracy of the base substrate used is insufficient, an image can be formed. A high-resolution color film which produces a sharp image can be stably manufactured. The depth of focus denotes a range in the depth direction in which no spread of irradiation light or no blur occurs on the exposure face.

As a color filter manufacturing apparatus of the invention, it is also preferable to use an exposure system (mirror projection exposure system) constructed in a manner similar to the above by using a mirror reflection optical member in place of the image forming optical member B for forming light in an image pattern.

As the mirror projection exposure system, a commercially available one can be used.

As a light source, a high-pressure mercury lamp or a mercury xenon lamp for outputting a deep UV can be preferably used. Although each of the lamps has some emission lines, in the case of using the projection exposure system, however, only one of the emission lines can be used to increase the resolution. The image forming optical member (lens) itself is constructed complicatedly.

In the invention, therefore, it is also preferable to use the reflection optical system using the mirror reflection optical member in place of the image forming optical system using the above-mentioned image forming optical member.

In the case of the reflection optical system, there is no chromatic aberration. It is advantageous since all the wavelengths of the light source can be used. Since the distance between the reflection mirror surface to the image formation irradiation surface (such as surface of the photoconductive thin film) can be freely designed, it can be freely designed in such a manner that the substrate is disposed so as to face upward and the under face is irradiated with light.

In the case of irradiating the under face with light, the electrodeposition solution has to be provided on the substrate. It is therefore advantageous since holding of the substrate is easy and a deflection is reduced.

Such a mirror projection exposure system can also be designed with a depth of focus of $\pm 10$ to $\pm 100$ $\mu$m. Even when a deflection or the like occurs in the substrate, an image can be formed on the surface of the photoconductive thin film relatively easily.

Liquid Crystal Display Element

The liquid crystal display element of the invention uses the color filter fabricated according to the color filter manufacturing method of the invention and uses its conductive film as the drive electrode. The liquid crystal display element has a simple structure and can display a clear full color image of high picture quality.

The composition of an aqueous colored electrodeposition solution is as follows. The solids content is in a range from 1 percent by weight to 40 percent by weight, preferably, from 5 percent by weight to 19 percent by weight. In the solids content concentration range where the concentration is lower than 1 percent by weight, there are problems such that the disperse stability of the colorant component cannot be easily achieved and sufficient optical density of an image cannot be easily obtained. In the solids content concentration range where the concentration is higher than 40 percent by weight, there are problems such that nonuniformity of the solution at the time of electrodeposition is caused and, since the solution exhibits thixotropy, handling such as carrying of the solution is complicated.

In the solids content of the electrodeposition solution, the colorant component quantity ranges from 20 percent by weight to 80 percent by weight in all of the solids content. 30 percent by weight to 50 percent by weight is preferable. In a value lower than the range, an image becomes too glossy or the optical density of an image is lowered. In a value higher than the range, the electrodeposition efficiency is lowered, a defect easily occurs in the formation of a layer in an image, fixing strength is reduced, and color tone deteriorates.

The conductivity of the electrodeposition solution is $10^3$ $\Omega \cdot$cm or lower, preferably, in a range from $10^3$ $\Omega \cdot$cm. With a value higher than the range, the electrodeposition voltage becomes high, a form generating phenomenon on the electrode becomes active, the electrodeposition phenomenon becomes unstable, and variations in the film quality of a formed image occur. When the conductivity is too low, the current of an image signal is diffused and the resolution of an image is reduced.

The viscosity of the electrodeposition solution is preferably in a range from 1 cps to 1000 cps and, more preferably, in a range from 10 cps to 200 cps. With a value lower than the range, the viscosity of the solution is insufficient, so that droplets apt to fly. With a value higher than the range, an operation load increases at the time of carriage or agitation of the electrodeposition solution. It causes problems such that complicated viscosity characteristics are exhibited and the efficiency deteriorates.

In the case of applying an electrodeposition method in which the electrodeposition material contained in the electrodeposition solution is deposited on the anode, the initial value of the pH of the electrodeposition solution is set to a value of $1\pm2$ from the deposition start pH point, more preferably, a value of $1\pm1.5$. In the case of an electrodeposition method in which the electrodeposition material is deposited on the cathode, the initial value of the pH of the electrodeposition solution is set to a value of $-1\pm2$ from the deposition start pH point, more preferably, a pH value of $-1\pm1.5$. By setting such an initial value, the deposition and sedimentation of the electrodeposition material is performed sharply and a high electrodeposition film generating efficiency is maintained. In the setting of the pH at which the electrodeposition material is deposited easier than at the deposition start pH point, the dispersion stability of the electrodeposition solution cannot be obtained. There are inconveniences such that colorant particles are deposited on an area which is not an image forming area and the electrodeposition amount varies. When the deposition start pH is set out of the range, the electrodeposition film generating efficiency is low and there are problems such as an increase in the electrodeposition potential and the low film quality of the generated film.

In relation to the preferred properties of the electrodeposition solution, the electrodeposition material which has an important function in an image forming and recording material of the invention has, as important roles, a function of improving the dispersion stability of the colorant particles in an aqueous solution as the main component of the electrodeposition solution, a function of forming an electrodeposition film (image) by promptly depositing and sedimenting by an electrodeposition phenomenon, that is, an electrochemical change in the environment, and a function of imparting water resistance to the electrodeposited film (image). Therefore, the electrodeposition material needs to have the molecular structure having both a group (hydrophilic group) which is hydrophilic and easily causes ionic dissociation in an aqueous solution and a hydrophobic group which does not have affinity for water.

An image forming action of the invention will now be described. The hydrophilic group causing ionic dissociation in a polymer of the electrodeposition material exhibits the function of hydrophobicity since the ionic dissociation is suppressed by a change in the pH of the electrodeposition solution on the surface of an image holding member by passage of a current. The whole structure of the electrodeposition material itself is accordingly made hydrophobic. The electrodeposition material including a colorant becomes insoluble in an aqueous solution and is deposited and sedimented on the surface of the image holding member surface, thereby forming an image. It is presumed that the phenomenon occurs in such a manner that a molecule chain spread in the solution of the electrodeposition material is reduced according to a change in pH, cohesion occurs together with the colorant particles, and an image including the colorant particles is deposited.

Figure 5:
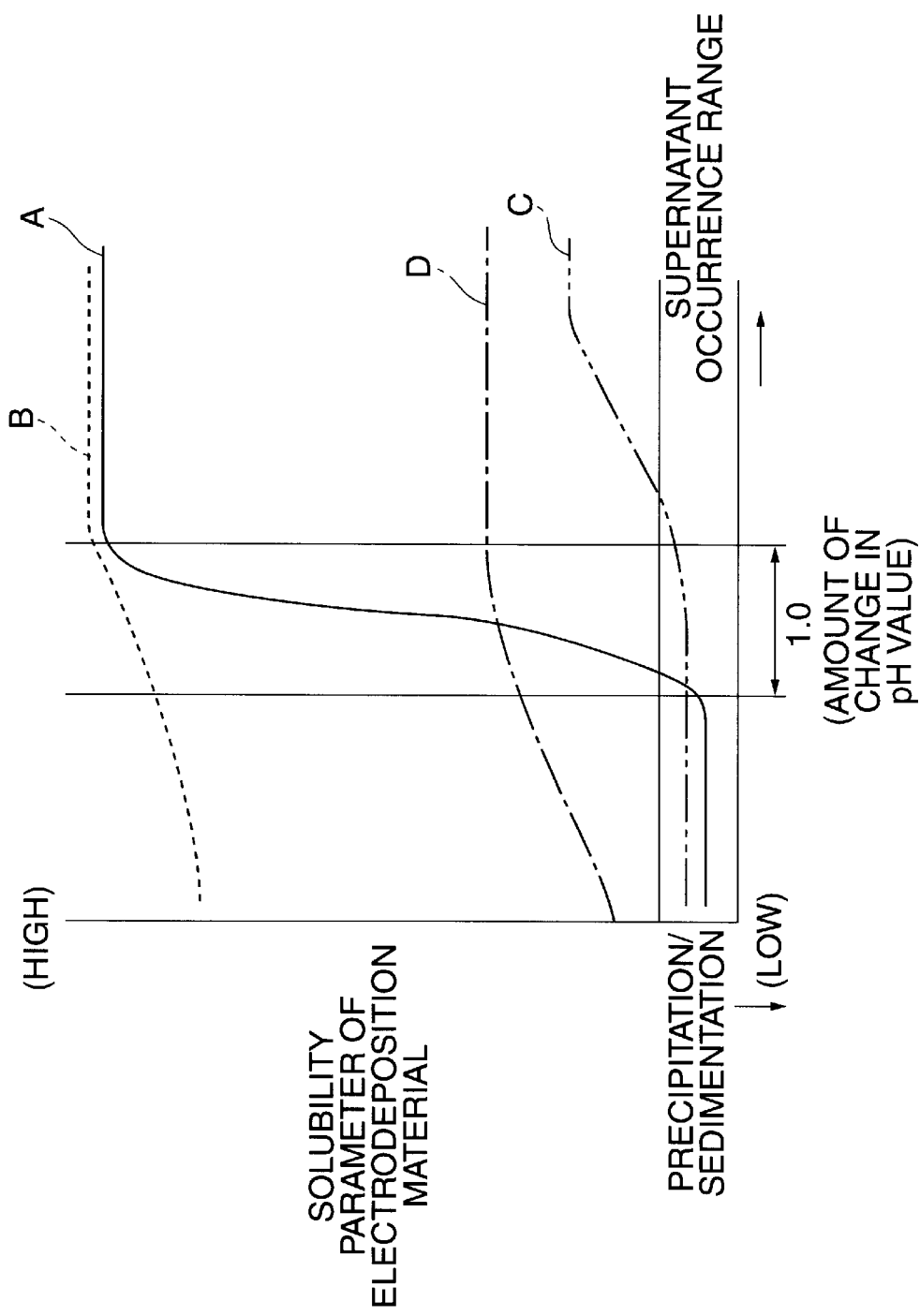
FIG. 5 is a graph showing the relation between a change in pH of a colorant and polymer dispersed solution and solubility parameter of the colorant and polymer material.

The graph of FIG. 5 shows the solubility parameter according to a change in the pH of the polymer as a standard to select a high-molecular compound used in the electrodeposition material. FIG. 5 is a graph showing the relation between the solubility parameter of a polymer used for various electrodeposition materials and the pH of the solution. In a material which has a good balance between the hydrophilic group and the hydrophobic group in the polymer and has the hydrophilic group changeable to a hydrophobic group according to conditions, as shown by solid line A, deposition suddenly occurs at a certain pH value. On the other hand, in the case of a material having a large quantity of the hydrophilic group, as shown by broken line B, the solubility is excellent irrespective of the pH value. In the case where the quantity of the hydrophobic group is large, as shown by an alternate long and two short-dash line C, the material has low solubility irrespective of the pH value. As for a material which has a good balance between the hydrophilic group and the hydrophobic group but does not have a hydrophilic group changeable to the hydrophobic group or the ratio of the hydrophilic group changeable to the hydrophobic group is low, as shown by an alternate long and short dash line D, though the solubility changes, a change in the solubility with respect to deposition is too low to form an image. The parameter changes also by the relation between the material and the solvent used. In the invention, the material which is suddenly deposited at a certain pH value as shown by the solid line A is preferable.

The electrodeposition material contains a thermoplastic resin component and has to exhibit sufficiently high solubility in an aqueous solution adjusted. As shown by the solid line A of FIG. 5, a liquid state change which makes the dissolved state of the electrodeposition material into supernatant and deposition in accordance with a change in the pH value of the electrodeposition solution in which the electrodeposition material is dissolved has to occur within the pH range of 1. In order to obtain more preferable characteristics, the pH range is desirably 0.5 or lower. By the characteristics in the range, an image can be deposited instantaneously according to a sharp pH change by a passage of a current. The cohesion of an image to be deposited is increased and the function of reducing the speed of redissolving in the electrodeposition solution can be provided. The water resistance of the image is consequently obtained. When the pH range of a liquid state change which brings about deposition from the dissolved state in accordance with a change in the pH value of the electrodeposition solution is larger than 1, in some cases, deterioration occurs in printing characteristics such as a decrease in the printing speed for obtaining a sufficient image structure and lack of water resistance of an image.

For example, when the carboxyl group is used as a hydrophilic group, the pH at the deposition start point and at the dissolution start point has to be set in an acid area. Generally, it is preferable to set the pH at the deposition start point and the dissolution start point in a range from 5.0 to 6.9, preferably, from 5.5 to 6.5. It is sufficient that the pH of a recording material at least in an area which comes into contact with the image holding member surface is set to the value. In practice, a buffer solution of a recording material is used and the deposition start point and the dissolution start point of a recording material can be recognized by a commercially available pH meter and visual observation.

As the function of the electrodeposition material according to the invention, the action characteristics are necessary. The structure and characteristics described hereinbelow are accordingly necessary.

The electrodeposition material is made by a copolymer containing a monomeric unit having a hydrophilic group which causes ionic dissociation and the minimum monomeric unit having a hydrophobic group which promotes the material not to be dissolved in an aqueous electrodeposition solution. The ratio of the number of the hydrophobic groups in the monomeric unit of the copolymer to the total number of the hydrophilic and hydrophobic groups is set within a range from 40% to 80%, more preferably, from 55% to 70%. Such a material is preferable since it has a high electrodeposition efficiency and exhibits electrodeposition characteristics capable of forming a film with a low electrodeposition potential and the liquid state of the electrodeposition solution is stable. In the case of a vinyl polymer or the like, the number of each of the hydrophobic groups and the hydrophilic groups can be calculated by using the charging ratio of the monomers at the time of a polymerization reaction of a polymer as a reference.

When the ratio of the number of hydrophobic groups in the monomeric unit of the copolymer constructing the electrodeposition material to the total number of the hydrophilic groups and hydrophobic groups is lower than 40%, the water resistance and the film strength of the electrodeposition film formed at the time of electrodeposition are insufficient. When the ratio of the number of the hydrophobic groups to the total number of the hydrophilic and hydrophobic groups is 80% or higher, the solubility in an aqueous solution is insufficient. It causes problems such that the electrodeposition solution becomes turbid, deposition of the electrodeposition material occurs, and the viscosity of the electrodeposition solution increases. Consequently, both of the cases are unpreferable.

Various polymers can be used in the invention. A vinyl polymer obtained from a vinyl monomer and a polyester resin obtained by condensation polymerization of polyol and polycarboxylic acid are preferable. The ratio between the hydrophilic group and the hydrophobic group in the polymer is as described above. In the case of the vinyl polymer, by charging the monomers so that the ratio of the number of hydrophobic groups in the monomeric unit of the vinyl polymer to the total number of the hydrophilic and hydrophobic groups lies within a range from 40% to 80%, a polymer having an almost equivalent ratio can be obtained. In the case of the polyester resin, by the condensation polymerization of a hydroxyl group of polyol and a carboxyl group of polycarboxylic acid, a polymer having a terminated hydroxyl group or carboxyl group can be obtained. In this case, by setting the charging amount of the polycarboxylic acid larger than polyol, a polymer having the carbonic acid at the terminal can be obtained. In this case, the number of hydrophobic groups and the number of hydrophilic groups in a monomeric unit used at the time of charging are different from those in the polymer obtained. In the invention, the ratio between the hydrophilic group and the hydrophobic group in the obtained polymer is important.

Preferably, 50% or higher, more preferably, 75% or higher of the hydrophilic group part in the monomeric unit of a copolymer constructing the electrodeposition material is a hydrophilic group part in the monomeric unit which can be reversibly changed to the hydrophobic group by a change in the pH. The hydrophilic group is a functional group which causes ionic dissociation in an aqueous solvent and becomes hydrophilic. When the ionic dissociation is suppressed by a change in the pH of the electrodeposition solution, the hydrophilic group shows the function of the hydrophobic nature.

Examples of the hydrophilic group which causes ionic dissociation include carboxyl group, amino group, sulfone group, quaternary ammonium group, sulfate group. Among them, a material having the carboxyl group or amino group as the hydrophilic group has high deposition efficiency of an image in an electrodeposition phenomenon and has characteristics of forming an electrodeposition film of high fastness properties. Those groups efficiently, reversibly change from the hydrophilic group to the hydrophobic group according to a change in the pH. The groups are therefore suitable for the invention.

To be specific, when an image pattern generating area is anodic with respect to a reference electrode, the electrodeposition material has the carboxyl group. The carboxyl group as the hydrophilic group part is ionic dissociates to an anion group. Simultaneously, a part of the electrodeposition material is bonded, adhered, or associated to the surface of the colorant particle. The acid value of the electrodeposition material lies preferably in a range from 60 to 300. Optimally, the acid value lies in a range from 90 to 150. When the image pattern generating area is cathodic with respect to the reference electrode, the electrodeposition material has the amino group. The amino group as the hydrophilic group part in the electrodeposition material ionic dissociates in an aqueous solution to become a cation group. Preferably, a part of the electrodeposition material is bonded, adhered, or associated to the surface of the colorant particle.

Figure 6:
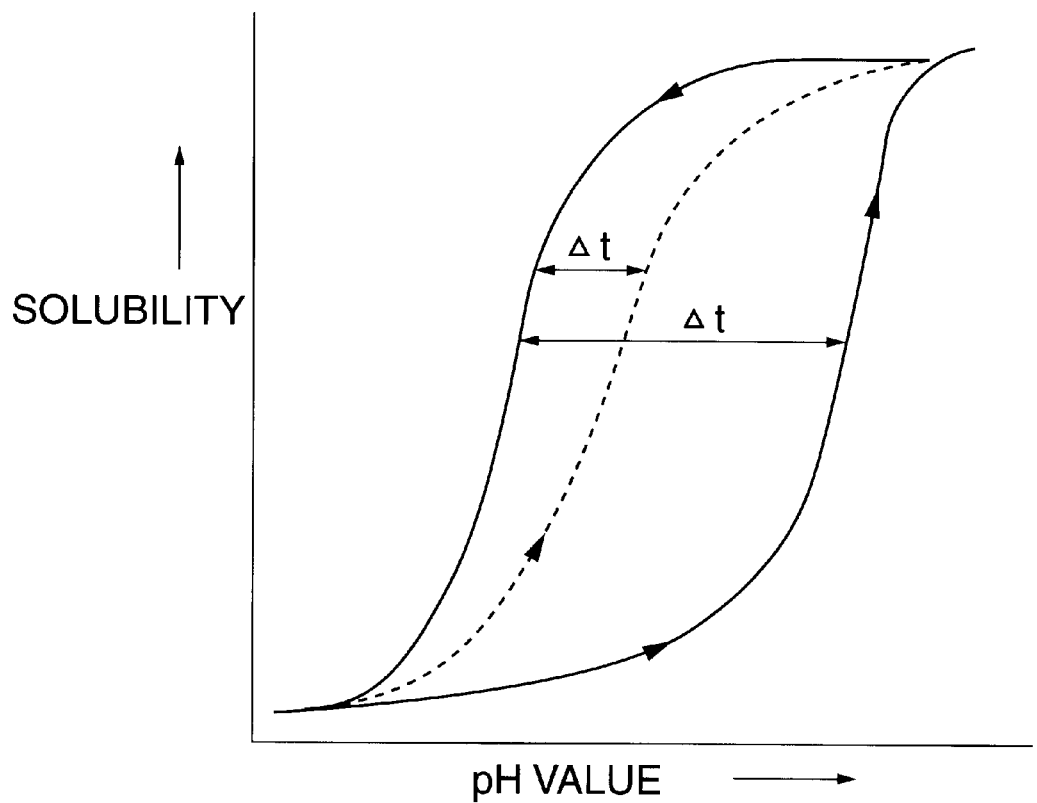
FIG. 6 is a conceptual diagram showing the conception of water resistance characteristic and deposition characteristic of a film made of an electrodeposition material, especially, hysteresis.

The electrodeposition material containing the hydrophilic group whose structure can change as mentioned above exhibits what is called a hysteresis loop as shown by a solid line in FIG. 6. Specifically, the redissolution does not occur suddenly according to a change in pH value. The deposition state is held for a predetermined period. The characteristics are ideal from the viewpoint of image forming performance and stability of the image formed. A material having the deposition characteristic shown by the solid line A in FIG. 5 and also the redissolution characteristic, that is, having large Δt in the graph of FIG. 6 is preferred. Δt serves as the scale of the water resistance of an electrodeposition film (image). Although a high-molecular compound shown by a broken line in FIG. 6 has a structure similar to that of a copolymer shown by the solid line, its molecular weight is less than 4,000 and the water resistance is low. The material is therefore easily redissolved. Although the material having the redissolution characteristic has a good image forming performance, the stability of a formed image is not so good. It is therefore necessary to devise holding of an image and carriage of a recording medium to a transfer processing unit.

To the hysteresis loop, not only the properties of the high-molecular compound but also properties regarding deposition of a material are related. It is known that the deposited electrodeposition material is agglomerated and the solution is pushed out from the agglomerate. Consequently, the water content of an image formed by the agglomerated material and colorant particles captured in the agglomerate is adjusted. For example, at the time of carrying the formed image to a transfer part for transferring the image, when application of a voltage is stopped and the pH value of the solution changes again, the dissolution of the electrodeposition material is not started immediately and the stability of the image becomes high.

The acid value of the electrodeposition material of a type of depositing an image on the anode lies preferably in a range from 60 to 300 from the viewpoint of obtaining good electrodeposition properties. When the acid value of the electrodeposition material is smaller than 60, the solubility in an aqueous solution is insufficient. It causes problems that the solids content density of the electrodeposition solution cannot be increased to a proper value, a liquid becomes turbid, deposit occurs, and the viscosity of a liquid increases. When the acid value of the electrodeposition material is larger than 300, the water resistance of a formed film is low and the electrodeposition efficiency with respect to a current passage quantity is low.

The electrodeposition material according to the invention has a high-molecular compound as the main component. The polymer compound is obtained by copolymerizing molecules containing the hydrophilic group and the hydrophobic group at the above ratio. The kind of each of the hydrophilic group and the hydrophobic group is not limited to one. The copolymer may be either random, block or graft copolymer.

By the copolymer whose number-average molecular weight is 4,000 to 30,000, an electrodeposition film (deposited image) which is good from the viewpoint of the quality of the electrodeposited film and bond strength of the film can be obtained. From the viewpoint of higher film quality and bond strength, preferably, the number-average molecular weight is 9,000 to 20,000. When the number-average molecular weight is lower than 4,000, the electrodeposition film is not uniform and has low water resistance, so that the fastness of the image formed is low. There is consequently the possibility that the film cannot be held in the image state and results in powders. On the other hand, when the number-average molecular weight is higher than 30,000, the solubility in an aqueous solution becomes insufficient. It causes problems that the solids content of the electrodeposition solution cannot be increased to a proper value, the liquid becomes turbid, deposit occurs, and the viscosity of the liquid increases.

The preferred properties of the electrodeposition material are as described above. Preferably, the electrodeposition material as an image forming material used in the image forming and recording method of the invention has all of the properties.

The colorant particles having average particle diameter in a range from 0.01 $\mu$m to 1.2 $\mu$m, preferably, from 0.02 $\mu$m to 0.3 $\mu$m are suitable for the image forming and recording method of the invention. When the average particle diameter is smaller than the range, a light shielding property of an image layer deteriorates. It causes problems that the optical image density decreases, an image becomes too glossy, and safety is not assured. When the average particle diameter is larger than the average particle diameter range, a dispersed state of the colorant particles in the electrodeposition solution becomes bad, a deposit occurs, an image layer containing the colorant particles becomes nonuniform, light is shielded by the particles so that a transmission type image cannot be dealt with, and an image becomes matte more than necessary. Especially in the range lower than 0.20 $\mu$m of the average particle diameter, an aqueous dispersant having excellent dispersion stability is obtained, and transparency of colors is high.

In order to prevent a change of properties in the electrodeposition solution due to evaporation of the aqueous solvent components, it is preferable to blend a water-soluble solvent as a wetting agent. As the water-soluble solvent, a high-boiling liquid having high hydrophilicity, azeotropic point with water, and low vapor pressure is preferred. The necessary parameters of the solvent are high polarity, boiling point of 120° C. or higher and saturated vapor pressure of 100 mmHg or lower in atmosphere, preferably, boiling point of 150° C. or higher and vapor pressure of 60 mmHg or lower in atmosphere. When the parameters are out of the ranges, a large amount of the electrodeposition solution evaporates, so that the life of the electrodeposition solution is shortened, the properties of the liquid change largely, and stable electrodeposition properties are not easily obtained. Preferably, the composition ratio lies in a range from 0.5 percent by weight to 70 percent by weight, more preferably, from 5 percent by weight to 30 percent by weight. Examples include ethylene glycol, diethylene glycol, polyethylene glycol, glycerin, diacetone alcohol, methyl Cellosolve, ethyl Cellosolve, butyl Cellosolve, and ethylene glycol acetate.

The foam forming phenomenon by the electrolysis of the electrodeposition solution has to be suppressed to a level at which an influence is not exerted on reproduction of a fine image pattern. The difference of voltages applied is 5 V or lower. In printing of a finer image (800 dpi or more), preferably, it is 3 V or lower. When importance is placed on the higher picture quality, a direct current field equal to or lower than 2.5 V is set. In some cases, a voltage applying unit uses a three-electrode method in which stabilization of a voltage is considered.

Embodiments

The invention will be described by the embodiments hereinbelow but is not limited to the embodiments.

Embodiment 1

A transparent conductive film made of ITO (ITO thin film) having a thickness of 100 nm was deposited by sputtering on a non-alkali glass substrate (7059 glass) having a thickness of 0.5 mm. A $TiO_2$ film ($TiO_2$ thin film) having a thickness of 200 nm was formed on the sol-gel method on the ITO thin film, thereby obtaining a substrate for electrodeposition having the structure shown in FIG. 2. The $TiO_2$ film was formed by depositing alkoxide (ATOLON NTi-092 made by Nippon Soda Co., Ltd.) by the spin coating method on the ITO substrate at a rotational speed of 1200 for 20 seconds and heating the film at approximately 500° C. for one hour.

In order to improve the current characteristic of the $TiO_2$ thin film, a reducing process was carried out by annealing the film in a pure nitrogen gas containing 3% of hydrogen gas at 330° C. or lower for ten minutes.

An apparatus constructed in a manner similar to FIG. 3 was prepared, which forms a color filter layer on the $TiO_2$ film by using the substrate 8 for electrodeposition on which the ITO thin film and the $TiO_2$ film are formed.

The substrate 8 for electrodeposition obtained as mentioned above was connected to the potentiostat 12 via the ITO thin film 6. The potentiostat 12 was connected to the reference electrode 13 and the counter electrode 11 in a three-electrode manner. The electrolyte 10 was prepared for the electrodeposition layer in the jig 9 for electrodeposition.

As the electrolyte 10, a water solution in which styrene-acrylic acid copolymer (molecular weight 13,000, the mole ratio of hydrophobic group/(hydrophilic group+hydrophobic group) of 65%, and acid value of 150) and carbon black powders (average particle diameter of 80 nm) are dispersed and mixed at the solids content of 1:2 was used.

The substrate 8 for electrodeposition was disposed so that the $TiO_2$ thin film 7 is in contact with the electrolyte 10 and is used as a work electrode for the counter electrode 11 (platinum electrode). A bias voltage of 1.7 V was applied to the substrate 8. Above the substrate 8 for electrodeposition, the exposure system 20 including the light source 1, image forming optical member 2, photomask 3, and image forming optical member 4 is disposed. The exposure system 20 is a projection exposure system in which the focal length between the image forming optical member 4 and the image forming face is 10 cm and the depth of focus is ±50 μm, which is made by Ushio Inc. The face on which the ITO thin film 6 is not provided, of the substrate 8 (back side of the substrate 8 for electrodeposition) is irradiated with ultraviolet rays (wavelength of 365 nm and light intensity of 50 $mW/cm^2$) emitted from the exposure system 20 in an image pattern of the photomask 3.

The projection exposure system 20 once forms an image on the photomask 3 having a pattern of line width of 10 nm via the image forming optical member 2 with light emitted from the light source 1. The light is further adjusted so as to form an image on the surface of the $TiO_2$ thin film 7 of the substrate 8 for electrodeposition via the image forming optical member 4.

The substrate 8 was exposed for two seconds. In the light-irradiated area on the surface of the $TiO_2$ thin film 7 in contact with the electrolyte 10, a black matrix made by thin lines having a line width of 10 nm was formed.

After that, the substrate 8 was washed and dried. The electrolyte 10 was replaced by a water solution in which a styrene—acrylic acid copolymer (molecular weight of 13,000, the mole ratio of hydrophobic group/(hydrophilic group+hydrophobic group) of 65%, and acid value of 150) and an azo red ultrafine particle pigment are dispersed and mixed at the solids content of 1:2. The $TiO_2$ thin film 7 on which the black matrix is formed was disposed on the jig 9 for electrodeposition as a work electrode in contact with the electrolyte 10 in a manner similar to the above. A bias voltage was set to 1.8 V and the film was irradiated with ultraviolet rays emitted from the projection exposure system 20 for two seconds. A red colored electrodeposition film was formed only in the area irradiated with light on the surface of the $TiO_2$ thin film 7.

Since the azo red ultrafine particle pigment is a highly conductive colorant, it was unnecessary to add another conductive material.

Subsequently, the electrolyte 10 was replaced by a water solution in which a styrene-acrylic acid copolymer (molecular weight of 13,000, the mole ratio of hydrophobic group/(hydrophilic group+hydrophobic group) of 65%, and acid value of 150), a phthalocyanine green ultrafine particle pigment, and ITO particles are dispersed and mixed at the solids content of 1:1:1. The $TiO_2$ thin film 7 on which the black matrix and the red colored electrodeposition film are formed was disposed on the jig 9 for electrodeposition as a work electrode in contact with the electrolyte 10 in a manner similar to the above. A bias voltage was set to 1.8 V and the substrate was irradiated with ultraviolet rays emitted from the projection exposure system 20 for two seconds. A green colored electrodeposition film was formed only in the area irradiated with light on the surface of the $TiO_2$ thin film 7.

Further, the electrolyte 10 was replaced by a water solution in which a styrene-acrylic acid copolymer (molecular weight of 13,000, the mole ratio of hydrophobic group/ (hydrophilic group+hydrophobic group) of 65%, and acid value of 150), a phthalocyanine blue ultrafine particle pigment, and ITO particles are dispersed and mixed at the solids content of 1:1:1. The $TiO_2$ thin film 7 on which the black matrix, the red colored electrodeposition film, and the green colored electrodeposition film are formed was disposed on the jig 9 for electrodeposition as a work electrode in contact with the electrolyte 10 in a manner similar to the above. A bias voltage was set to 1.8 V and the substrate was irradiated with ultraviolet rays emitted from the projection exposure system 20 for two seconds. A blue colored electrodeposition film was formed only in the area irradiated with light on the surface of the $TiO_2$ thin film 7. In such a manner, a conductive color filter (1) of the invention having excellent surface smoothness and high resolution was obtained.

Embodiment 2

In place of the projection exposure system used as the exposure system 20 in Embodiment 1, a mirror projection exposure system (in which a mercury xenon lamp of 1 KW is used as a light source so as to generate deep UV) was used. In a manner similar to Embodiment 1 except for the exposure system, a conductive color filter (2) of the invention having excellent surface smoothness and high resolution was obtained.

Embodiment 3

The substrate 8 for electrodeposition obtained in a manner similar to Embodiment 1 was used. Before forming the black matrix, colored electrodeposition films of red (R), green (G), and blue (B) were sequentially formed in a manner similar to Embodiment 1. The substrate 8 for electrodeposition on which colored electrodeposition films of three colors of BGR are formed was cleaned and dried.

Subsequently, the $TiO_2$ thin film 7 on which the colored electrodeposition films of three colors are formed of the substrate 8 for electrodeposition was allowed to be in contact with a solution obtained by dispersing carbon black powders (average particle diameter of 80 nm) into an ultraviolet-curing resin. The whole surface of the non-alkali glass substrate 5, on which no colored electrodeposition film is formed is irradiated with ultraviolet rays by using an exposure system (made by Ushio Inc.). The ultraviolet rays transmit only the area where no color deposition film is formed and were cured. Consequently, a black matrix made by a resin thin film containing carbon black was formed only in the area where no colored electrodeposition film was formed. As mentioned above, a conductive color filter (3) of the invention having excellent surface smoothness and high resolution was obtained.

According to the conductive color filter manufacturing method of the invention, a conductive color filter having a fine, complicated pixel pattern, high resolution, excellent surface smoothness, and uniform high conductivity which can accurately control alignment of liquid crystal molecules can be easily manufactured. By using the method, the simple-structured conductive color filter manufacturing apparatus which can manufacture a color filter having a uniform, highly conductive color filter layer with high resolution at low cost can be provided.

According to the invention, without forming a conductive layer on the formed color filter layer, a uniform, highly conductive color filter which can be directly used for a liquid crystal display element can be provided.

By adopting the conductive color filter of the invention, a liquid crystal display element in which the light-transmitting conductive film constructing the color filter is used as a drive electrode for realizing a liquid crystal display can be provided.

What is claimed is:

1. A method of manufacturing a conductive color filter, comprising:
   a step of selectively forming a black matrix on a light-transmitting photoconductive thin film of a light-transmitting substrate on which a light-transmitting conductive film and the photoconductive thin film having a function of generating a photovoltaic force are stacked in this order; and
   a step of allowing at least the photoconductive thin film of the substrate to be in contact with an electrolyte including a colorant, a conductive substance and a high-molecular compound, irradiating the photoconductive thin film with light, selectively making a light-irradiating area of the photoconductive thin film generate a photovoltaic force, and electrochemically depositing the electrodeposition material to thereby form a conductive colored electrodeposition film.

2. A conductive color filter manufacturing method according to claim 1, wherein the electrodeposition material contains a compound having a carboxyl group.

3. A conductive color filter manufacturing method according to claim 2, wherein the compound having the carboxyl group is a polymer having a hydrophobic group and a hydrophilic group and the number of hydrophobic groups is 40 to 80% of the total number of the hydrophobic and hydrophilic groups.

4. A conductive color filter manufacturing method according to claim 3, wherein the polymer is a random copolymer of a monomer having a hydrophobic group and a monomer having a hydrophilic group.

5. A conductive color filter manufacturing method according to claim 3, wherein 50% or more of the number of hydrophilic groups of the polymer can change from a water-soluble state to a water-insoluble state or reversibly from a water-insoluble state to a water-soluble state in accordance with a change in pH.

6. A conductive color filter manufacturing method according to claim 1, wherein the electrodeposition material contains a light-transmitting conductive material.

7. A conductive color filter manufacturing method according to claim 6, further comprising:
   a step of forming a conductive protective layer on the colored electrodeposition film and the black matrix that contain water by which charges can move, after forming the conductive colored electrodeposition film and the black matrix.

8. A conductive color filter manufacturing method according to claim 1, wherein the coloring material is a conductive colorant which can control alignment of liquid crystal molecules.

9. A conductive color filter manufacturing method according to claim 8, wherein the content of a compound having the carboxyl group is 1.5 percent by weight or lower in contrast to 1 percent by weight of the conductive colorant.

10. A conductive color filter manufacturing method according to claim 1, wherein the electrodeposition material contains a light-transmitting conductive high-molecular compound.

11. A conductive color filter manufacturing method according to claim 1, wherein the electrolyte contains supporting salt which does not exert an influence on electrodeposition characteristics.

12. A conductive color filter manufacturing method according to claim 1, wherein a voltage of 5 V or lower is used as an electrodeposition potential in the step of forming the conductive colored electrodeposition film.

13. A conductive color filter manufacturing method according to claim 1, wherein after the black matrix is formed via a photomask, a colored electrodeposition film of a single color or plural colors is formed so as to have an area overlapped with the black matrix.

14. A conductive color filter manufacturing method according to claim 1, wherein after a colored electrodeposition film of a single color or plural colors is formed via a photomask, a black matrix is formed so as to have an area overlapped with the colored electrodeposition film.

15. A conductive color filter manufacturing method according to claim 1, wherein light irradiation is performed by an exposure system in which at least an image forming optical member A, a photomask for patterning a substrate on which at least a conductive film and a photoconductive thin film are stacked in this order, an image forming optical member B, and a light source are disposed in this order from the substrate side.

16. A conductive color filter manufacturing method according to claim 1, wherein light irradiation is performed by an exposure system in which at least a mirror reflection optical member, a photomask for patterning a substrate on which at least a conductive film and a photoconductive thin film are stacked in this order, an image forming optical member, and a light source are disposed in this order from the substrate side.

17. A conductive color filter obtained by the conductive color filter manufacturing method according to claim 1.

18. A liquid crystal display element,
wherein a light-transmitting conductive film in the conductive color filter according to claim 17 is used as a drive electrode for liquid crystal display by using the conductive color filter.

19. A conductive color filter manufacturing method comprising:
a step of selectively forming a black matrix on a photoconductive thin film on a light-transmitting substrate on which a light-transmitting conductive film and a light-transmitting semiconductor film are stacked in this order; and
a step of allowing at least the photoconductive thin film on the substrate to be in contact with a colorant particle dispersed solution in which an aqueous liquid, colorant particles, a conductive substance, and a high-molecular compound which is chemically dissolved or precipitated and sedimented according to a change in a pH value in the aqueous liquid are dispersed, irradiating the photoconductive film with light to change the pH value of the colorant particle dispersed solution near the photoconductive film, thereby changing solubility parameter of the high-molecular compound, and precipitating and adhering the conductive substance and the colorant particles on a holding member.

20. A conductive color filter manufacturing method according to claim 19, wherein the dissolution or precipitation and sedimentation of the high-molecular compound occurs according to a reversible change in solubility in the aqueous solution in the high-molecular compound.

21. A conductive color filter manufacturing method according to claim 19, wherein a group on the high-molecular compound which contributes to the change in the solubility is either a carboxyl group or an amino group.

22. A conductive color filter manufacturing method according to claim 19, wherein the solubility parameter in the aqueous solution in accordance with a change in the pH value of the high-molecular compound exhibits a hysteresis curve.

23. A conductive color filter manufacturing method according to claim 19, wherein the high-molecular compound has a hydrophobic monomer structure unit selected from alkyl group, styrene, α-methylstyrene, methyl methacrylate, butyl methacrylate, acrylonitrile, vinyl acetate, methyl acrylate, butyl acrylate, lauryl methacrylate, and their derivatives.

24. A conductive color filter manufacturing method according to claim 19, wherein the high-molecular compound has an acid value in a range from 60 to 300.

25. A conductive color filter manufacturing method according to claim 19, wherein the colorant particle dispersed solution further contains a water-soluble solvent having a boiling point of 120° C. or higher and a vapor pressure in atmosphere of 50 mmHg or lower.

26. A conductive color filter manufacturing method according to claim 19, wherein an average particle diameter of the colorant particle lies in a range from 0.02 μm to 0.3 μm.

27. A conductive color filter manufacturing method according to claim 19, wherein the conductivity of the aqueous solution is $10^5$ Ω·cm or lower.

28. A conductive color filter manufacturing method according to claim 19, wherein a change from the dissolution to the precipitation and sedimentation occurs within a pH range of 1.

29. A conductive color filter manufacturing method according to claim 19, wherein a current is passed while suppressing a foam forming phenomenon caused by electrolysis of the solution.

30. A color filter comprising:
a light-transmitting substrate;
a light-transmitting conductive film on the substrate;
a light-transmitting semiconductor film on the light-transmitting conductive film;
a black matrix on the light-transmitting semiconductor film; and
a conductive colored electrodeposition film neighboring the black matrix.

31. A color filter according to claim 30, wherein conductivity (resistance value) of the conductive red electrodeposition film lies within a range from to $10^1$ to $10^4$ Ω·cm.

* * * * *